United States Patent

Morikawa et al.

[11] Patent Number: 6,043,897
[45] Date of Patent: Mar. 28, 2000

[54] IMAGE FORMING APPARATUS

[75] Inventors: Takeshi Morikawa, Toyokawa; Tomoyuki Atsumi, Toyohashi; Eiichiro Kawasaki; Eiichi Yoshida, both of Toyokawa; Yoshikazu Ikenoue, Toyohashi; Akio Nakajima, Toyokawa, all of Japan

[73] Assignee: Minolta Co., Ltd., Osaka, Japan

[21] Appl. No.: 08/948,647

[22] Filed: Oct. 10, 1997

[30] Foreign Application Priority Data

Dec. 4, 1996 [JP] Japan .................................. 8-323854
Dec. 5, 1996 [JP] Japan .................................. 9-054966
Dec. 5, 1996 [JP] Japan .................................. 8-325114

[51] Int. Cl.$^7$ .................................................. G06K 15/00
[52] U.S. Cl. ...................... 358/1.14; 358/261.3; 358/296; 358/404; 358/426; 358/433; 358/437; 358/444; 358/1.15; 358/1.16; 382/251; 348/27
[58] Field of Search ...................... 395/114, 115, 395/116; 358/261.1–261.3, 430, 433, 404, 444, 468, 296, 437, 426; 382/232–233, 244–245, 251; 348/27

[56] References Cited

U.S. PATENT DOCUMENTS

| 5,638,498 | 6/1997 | Tyler et al. ............................ 395/117 |
| 5,649,033 | 7/1997 | Morikawa et al. . |
| 5,708,762 | 1/1998 | Chiba et al. .......................... 395/108 |
| 5,832,126 | 11/1998 | Tanaka .................................. 382/239 |
| 5,850,504 | 12/1998 | Cooper et al. ........................ 395/117 |

FOREIGN PATENT DOCUMENTS

| 05227411 | 9/1993 | Japan . |
| 06105119 | 4/1994 | Japan . |
| 06155850 | 6/1994 | Japan . |
| 06183093 | 7/1994 | Japan . |
| 07245671 | 9/1995 | Japan . |

OTHER PUBLICATIONS

OS/390 SDSF Guide and Reference, Topic 3.13, c. 1986.

*Primary Examiner*—Mark R. Powell
*Assistant Examiner*—Lance W. Sealey
*Attorney, Agent, or Firm*—McDermott, Will & Emery

[57] ABSTRACT

In an image forming apparatus for reading a document image and forming the document image on a paper, document image data are divided into a plurality of blocks and the document image data are compressed in the unit of block to be stored in a first memory device. The data read from the first memory device are expanded in the unit of block to be stored in a second memory device. Compression time and expansion time are estimated and image output start time for a printer is set based on the compression and expansion times before expansion of all the blocks is completed. In a different way, the start time is set to read data from a second memory device by a printer for printing, after estimation based on expansion time on data not yet expanded by an expansion device. In a still different way, predetermined form data such as page number are superposed with image data. The form data is drawn first in a page memory device and expanded image data are superposed next in the page memory device. Print is started by taking drawing time of the form data into account.

29 Claims, 22 Drawing Sheets

IMAGE FORMING APPARATUS

BACKGROUND OF THE INVENTION

1. Field of the Invention

The present invention relates to an image forming apparatus which reads a document as digital image data, compresses them to be stored in a memory device and prints the image after expanding the compressed image data in the memory.

2. Description of Prior Art

An image forming apparatus such as a digital copying machine reads a document as digital image, and the image data are stored in a memory device temporarily. After one page of the document is read, the image data are read from the memory device and supplied to a printer. It is also possible to edit document images, for example, to add page number, date or the like.

In a digital copying machine, the image data are compressed in the unit of page and stored in a code memory, in order to decrease a memory capacity. When printing is started, the data in the code memory are expanded in the unit of page and stored in an image memory. When one page of the document is expanded, the image data are read from the image memory and printed on a paper. Therefore, image output with the printer is started after all the image on one page is read and all the image data are expanded.

In a copying machine, in order to print a document fast, paper is supplied beforehand for printing when all the document is read. By supplying papers beforehand successively,- decrease in throughput due to delay of paper supply can be prevented. For example, in a first copy in a copying machine, the printer supplies a paper beforehand to a timing roller when start key is pressed, and a document is fed by a document feeder at the same time. When the document reaches to the read position, image read is started. By supplying the paper to the timing roller beforehand, image forming speed is improved.

Previously, image output to the printer is not started until all the image on one page is read and all the image data are expanded. Therefore, a time to be waited at the timing roller becomes long, especially for a document of large size such as A3, and the first copy speed is low.

Expansion time becomes longer and the time to be waited at the timing roller also becomes longer, for example, when compression ratio of document image is low or when a save copy mode is set where a plurality of document images are formed on a sheet of paper. Then, it is desirable that a next image output can be started always within a paper supply time in the printer.

If additional information such as page number is added to the data expanded in a page memory, image can be output only after the additional information is added to the expanded data. Therefore, when additional information is added to the image data, a time from the start of expansion to the start of output becomes longer, and copy speed becomes lower.

SUMMARY OF THE INVENTION

An object of the present invention is to provide an image forming apparatus which can form an image efficiently even for a large size document without decreasing first copy speed.

Another object of the present invention is to provide an image forming apparatus which can start to output a next image within a paper supply time in the printer irrespective of compression rate of document image or save copy mode.

A further object of the present invention is to provide an image forming apparatus which can print an image synthesized with additional information in a shorter time.

In one aspect of the invention, an image forming apparatus reads a document image and forms the document image on a paper. The apparatus has first and second memory devices for storing data. A compression device divides document image data into a plurality of blocks and compresses the document image data in the unit of block to be stored in the first memory device. An expansion device expands the compressed data read from the first memory device in the unit of block and stores the expanded data in the second memory device. A printer prints data read from the second memory device. A controller estimates compression time for compression and expansion time for expansion and setting image output start time based on the compression and expansion times before expansion of all the blocks is completed.

Preferably, if a paper supplier can supply a first paper of the same size in the same direction as the image and a second paper of the same size but in a lateral direction to that of the first paper, when the printer starts printing during compression, a second controller inhibits the image rotation device to rotate the image and makes the paper supplier supply a paper in the same direction as that of the image automatically.

In a second aspect of the invention, in an image forming apparatus for reading a document image and forming the document image on a paper, a controller sets a start time to read data from a second memory device by a printer for printing, after estimating the start time based on expansion time on data not yet expanded by an expansion device. In a different aspect, a controller estimates compression time on data not yet compressed and expansion time and sets an image output start time by a printer based on the compression and expansion times before expansion of all the blocks is completed.

In a third aspect of the invention, predetermined form data are stored in a second memory device. The form data is drawn first in a page memory device and expanded image data are superposed in the page memory device wherein the form data have already been drawn.

An advantage of the invention is that an image forming apparatus can start printing earlier.

Another advantage of the invention is that image output can be performed efficiently.

A further advantage of the invention is that image forming speed can be performed efficiently when additional information is added to the image data.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
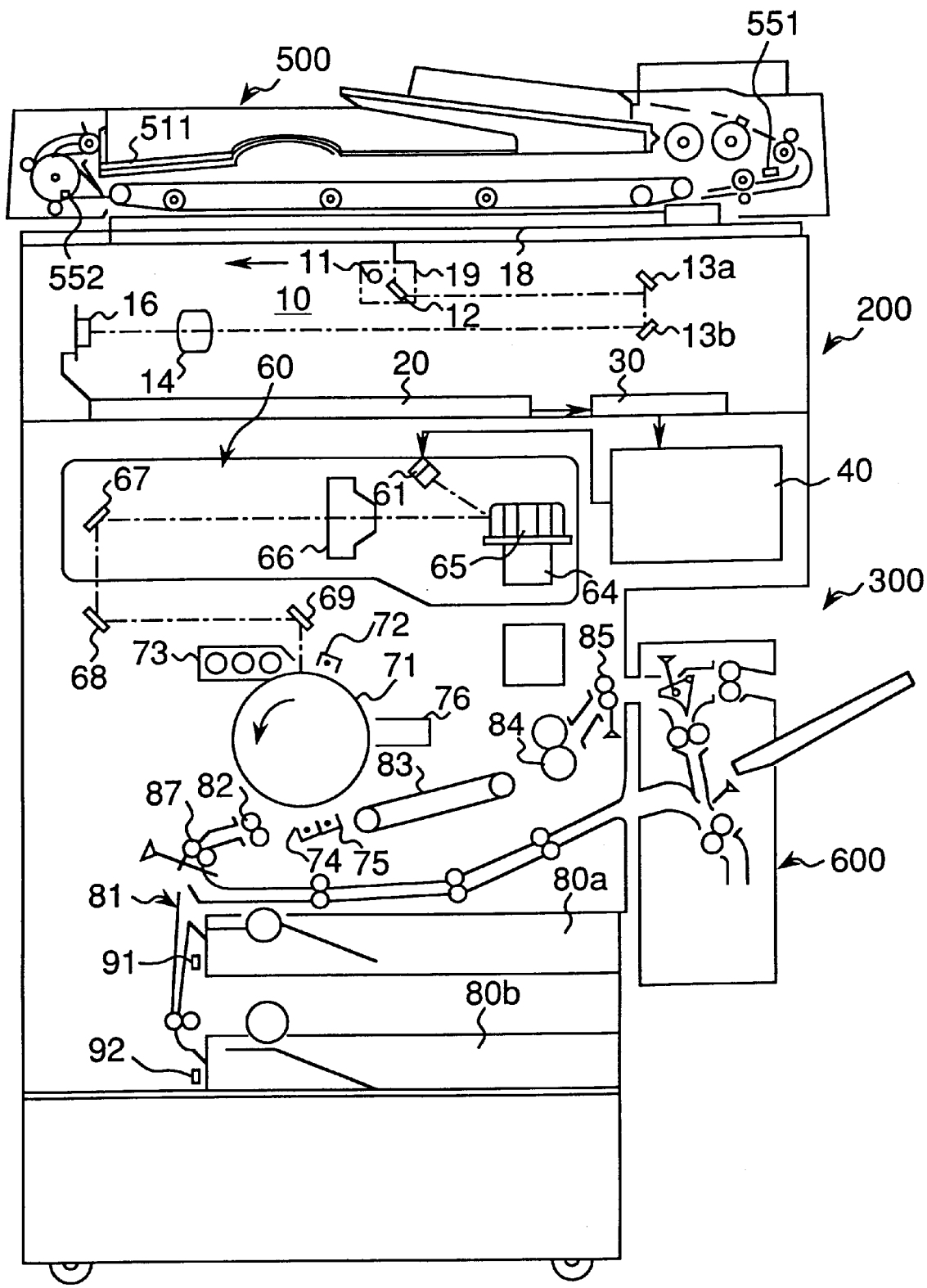
FIG. 1 is a schematic sectional view of a digital copying machine of a first embodiment of the invention.

Referring now to the drawings, wherein like reference characters designate like or corresponding parts throughout the views, a structure of a digital copying machine of a first embodiment of the invention is explained first. FIG. 1 shows the digital copying machine schematically comprising an image reader 200, a printer 300, a document feeder 500 and a re-feed unit 600.

In the document feeder 500, a document put on a tray 510 is fed automatically onto a platen glass 18. After the document is read, the document is discharged onto another tray 511. Document size sensors 551 and 552 detect the document size.

The image reader 200 has a scan system 10, an image signal processor 20 and the like. The scan system 10 reads a document on the platen glass 18 and converts the document image to electric signals. In the scan system, a document is exposed with a lamp 11 mounted to a scanner 19 which is moved below the platen glass 18. A light reflected from the document is guided by mirrors 12, 13a and 13b and transmits through a conversion lens 14 and enters into a photoelectric element 16 such as a CCD array, which converts the reflected light to electric signals. The image signal processor 20 processes the electric signals and outputs image data to a memory unit 30. The memory unit 30 outputs the as-received data to the printer 300 or stores them in a memory.

The printer 300 has a print processor 40, an optical system 50, an image forming system and the like. The print processor 40 drives a diode laser 61 in the optical system 50 according to the image data received from the image reader 200. In the optical system 50, a beam emitted by the laser diode 61 is inclined by a polygon mirror 65 and guided through a main lens 66, mirrors 67, 68 and 69 to an exposure position on a photoconductor drum 71. Then, a latent image of the document is formed on the photoconductor drum 71.

An image is formed in an electrophotographic process. The latent image formed on the photoconductor drum 71 is developed, transferred onto a paper and fixed thereon to form the image on the paper. In the development and transfer system, the photoconductor drum 71 is charged uniformly by a sensitizing charger 72 and subjected to the exposure of the reflected light. Then, the image is developed by a development unit 73. A toner image obtained by the development is transferred by the transfer charger 74 onto a paper, and the paper is separated from the separation charger 75. In a paper carriage system, a paper is supplied from a paper cassette 80a, 80b and guided through a paper guide 81 and a timing roller 82 to the photoconductor drum 71. Sensors 91 and 92 detect paper size of papers put in the cassettes 80a and 80b. A paper of the same size (say A4) can be supplied from the two cassettes 80a and 80b in the vertical direction (T) and in the horizontal direction (Y). A paper in the vertical direction" means a paper longer in the vertical direction (T), while a "paper in the horizontal direction" means a paper longer in the horizontal direction (Y). After the transfer of the toner image, the paper is carried by a belt 83 to a fixing roller 84. In the fixing system, the roller 84 fixes the image and the paper is discharged by a discharge roller 85.

The re-feed unit 600 is provided as an accessary for double-side copy and the like. The re-feed unit 600 and a re-feed system in the printer 300 are not explained here.

Figure 2A:
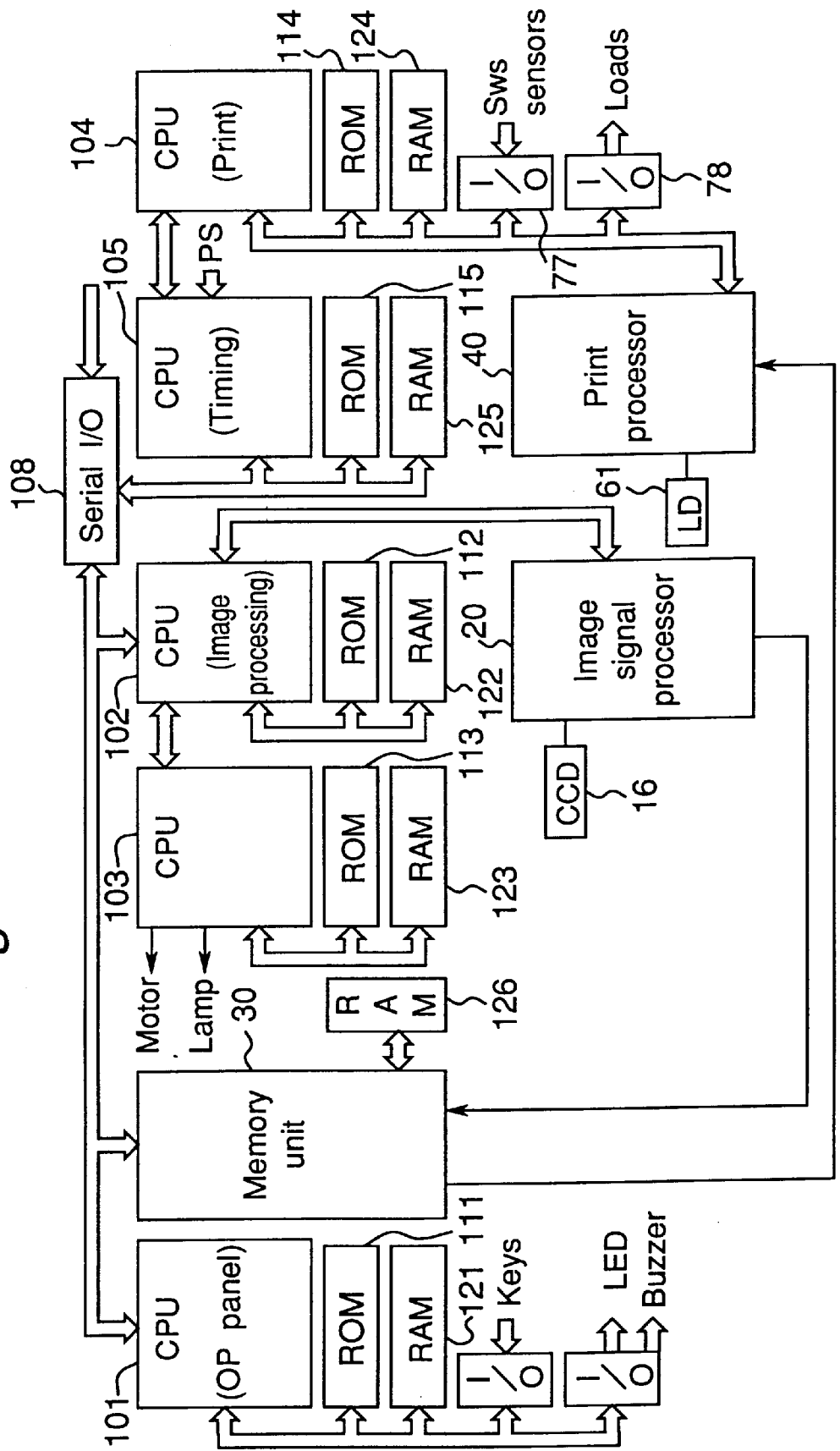
FIGS. 2A and 2B are block diagrams of a control system of the digital copying machine.
Figure 2B:
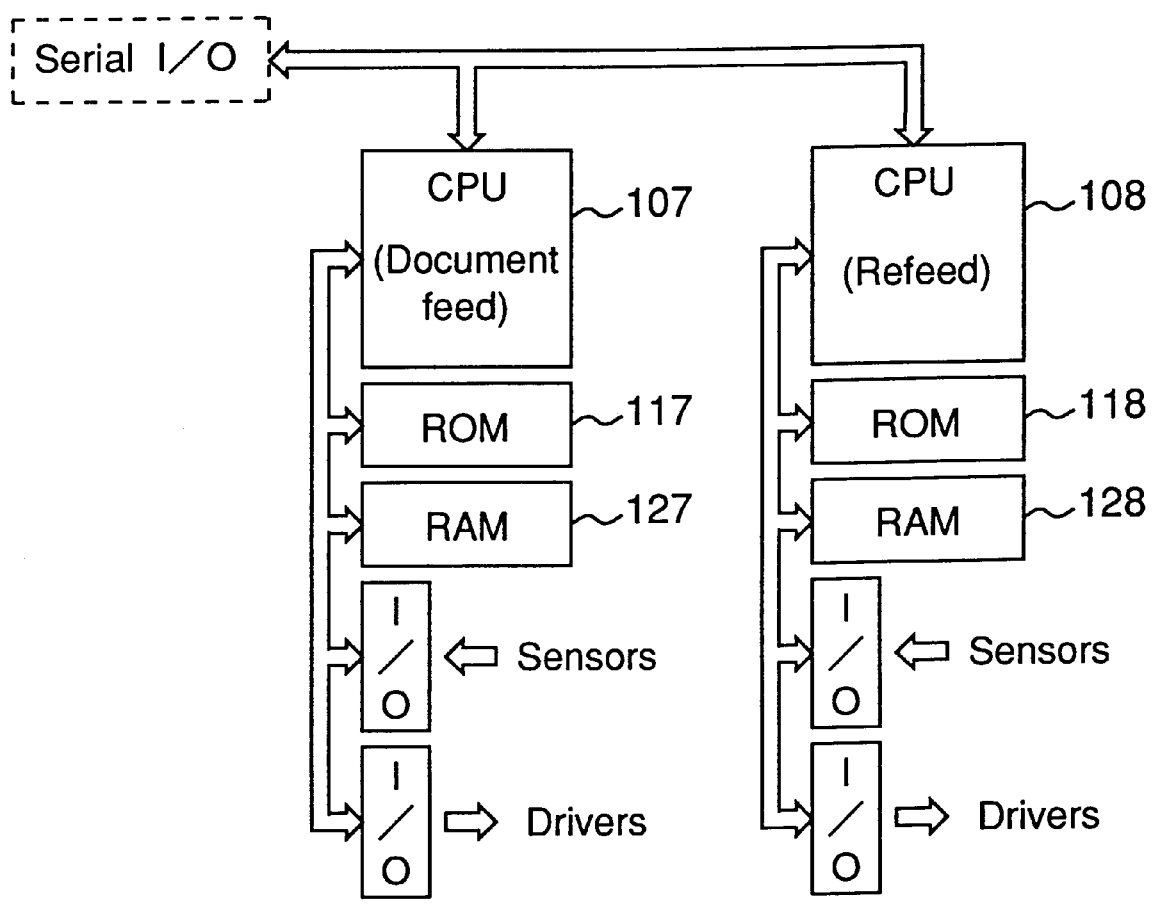
Figure 3:
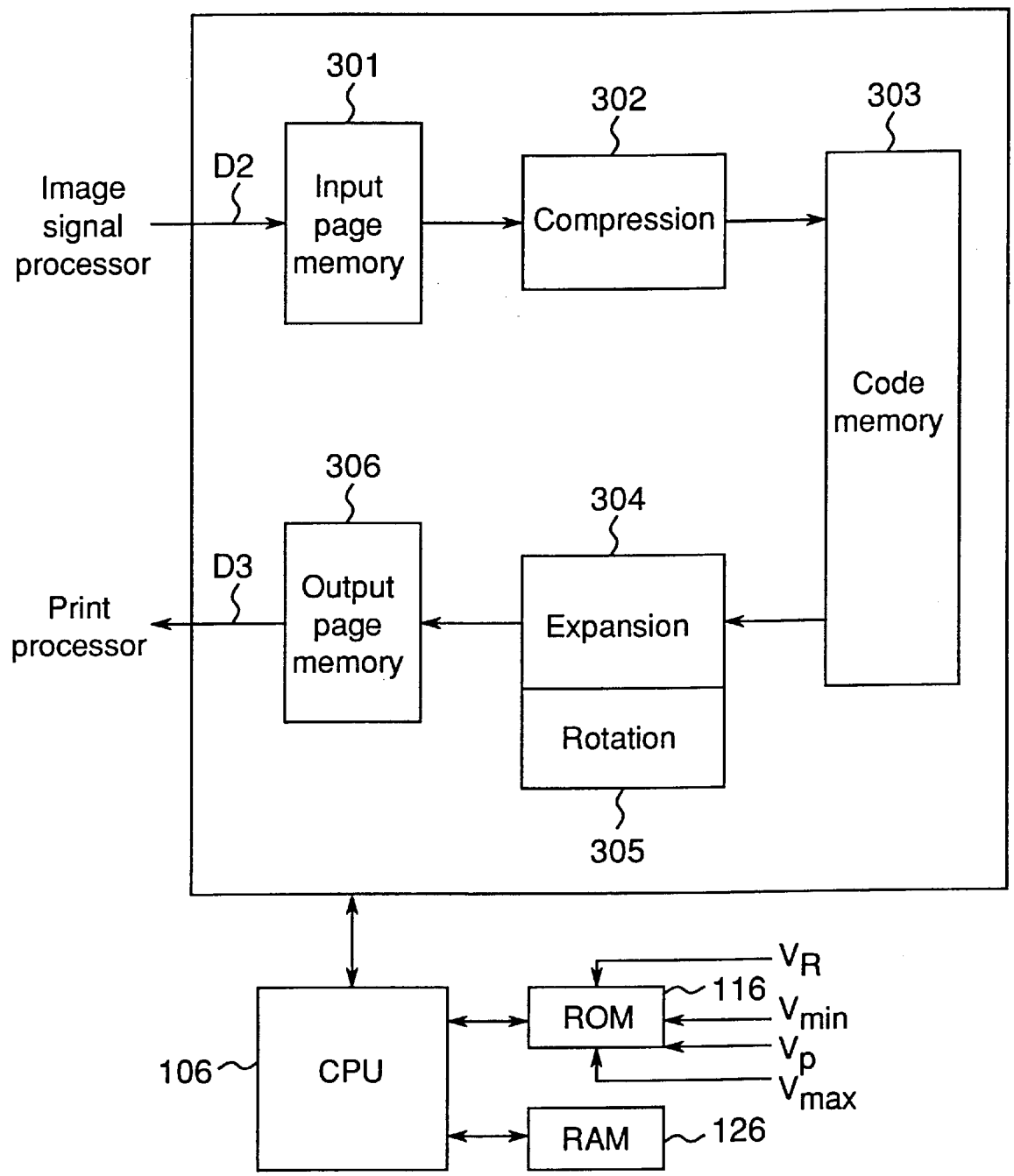
FIG. 3 is a block diagram of a memory unit.

Next, a control system of the copying machine is explained with reference to FIGS. 2A and 2B. The control system has eight central processing units (CPUs) 101–108, and each CPU 101–108 is connected to a read only memory (ROM) 111–118 storing the program and a random access memory (RAM) 121–128 as a work area for executing the program. The CPU 106 is provided in the memory unit 30 (FIG. 3).

The CPU 101 controls key-inputs from various keys and a display panel in an operational panel (not shown). The CPU 102 controls the image signal processor 20. The CPU 103 controls the scan system 10 in the image reader 200. The CPU 104 controls the print processor 40, the optical system 60 and the image forming system. The CPU 104 has paper size data from the sensors 91 and 92 for the cassettes 80a and 80b. The CPU 105 processes timing control and sets operation modes for the entire control system. The CPU 106 controls the memory unit 30 to compress image data to be stored in a code memory 303 (FIG. 4) and to expand them to be sent to the print processor 40. Thus, the image reader 200 and the printer 300 are controlled independently of each other, and copy speed is improved. The CPU 107 controls the document feeder 500. The document size is detected by the sensors 551 and 552 when a document is fed. The CPU 108 controls the re-feed unit 600. The CPUs 101–108 performs serial communication between them with use of interrupt, to transmit commands, reports and other data.

Next, image data processing is performed by using the image memory. A page of image data are processed by dividing them into a plurality of blocks. Data read from a document are converted by the image signal processor 20 to digital image data. The image data are compressed in the memory unit 30 in the unit of block and stored in the code memory. When the image is reproduced, the compressed data is read from the code memory and supplied to the printer 300.

First, the image signal processor 20 is explained. The image signal processor 20 has an A/D converter, a shading correction section and the like. The image signal processor 20 quantizes the input signals received from the photoelectric converter 16 to 8-bit image data for each pixel. Then, the data are subjected to various processings and are output as image data D2 to the memory unit 30.

Next, the memory unit 30 is explained with reference to a block diagram shown in FIG. 3. When a document is read, image data D2 from the image signal processor 20 are received by an input image memory 301. Next, a compression device 302 compresses the image data D2 in the unit of block. The compressed data are transmitted to the code memory 303 and stored therein. The code memory 303 is for example a multi-port memory having a capacity of fifty pages of A4 size documents at 400 dots per inch (dpi).

The compression speed of the compression device 302 depends on the image data. If the document includes a large area of characters, the compression speed is high, while if the document includes an image such as a photograph, the compression speed is low. The compression device 302 has specifications on the maximum compression speed $V_{max}$ and the minimum compression speed $V_{min}$.

When printing is performed, the compressed image data in the code memory 303 are expanded by an expansion device 304. If rotation is necessary, a rotation device 305 performs rotation thereof in the unit of block. The expanded (and rotated) data are sent to an output page memory 306. All the image of one page are drawn in the output page memory 306. By controlling the read address, the direction of an image can be rotated by 90°, so that the direction of the image can be agreed with the direction of a paper on which the image is printed.

The memory unit 30 is controlled by the CPU 106 according to a program stored in the ROM 116, which stores also image input speed $V_R$, maximum compression speed $V_{max}$, worst expansion speed $V_{min}$ and image output speed $V_p$. The RAM 126 stores parameters for executing the program such as compression completion time $tc_1$, for the first block.

Figure 5:
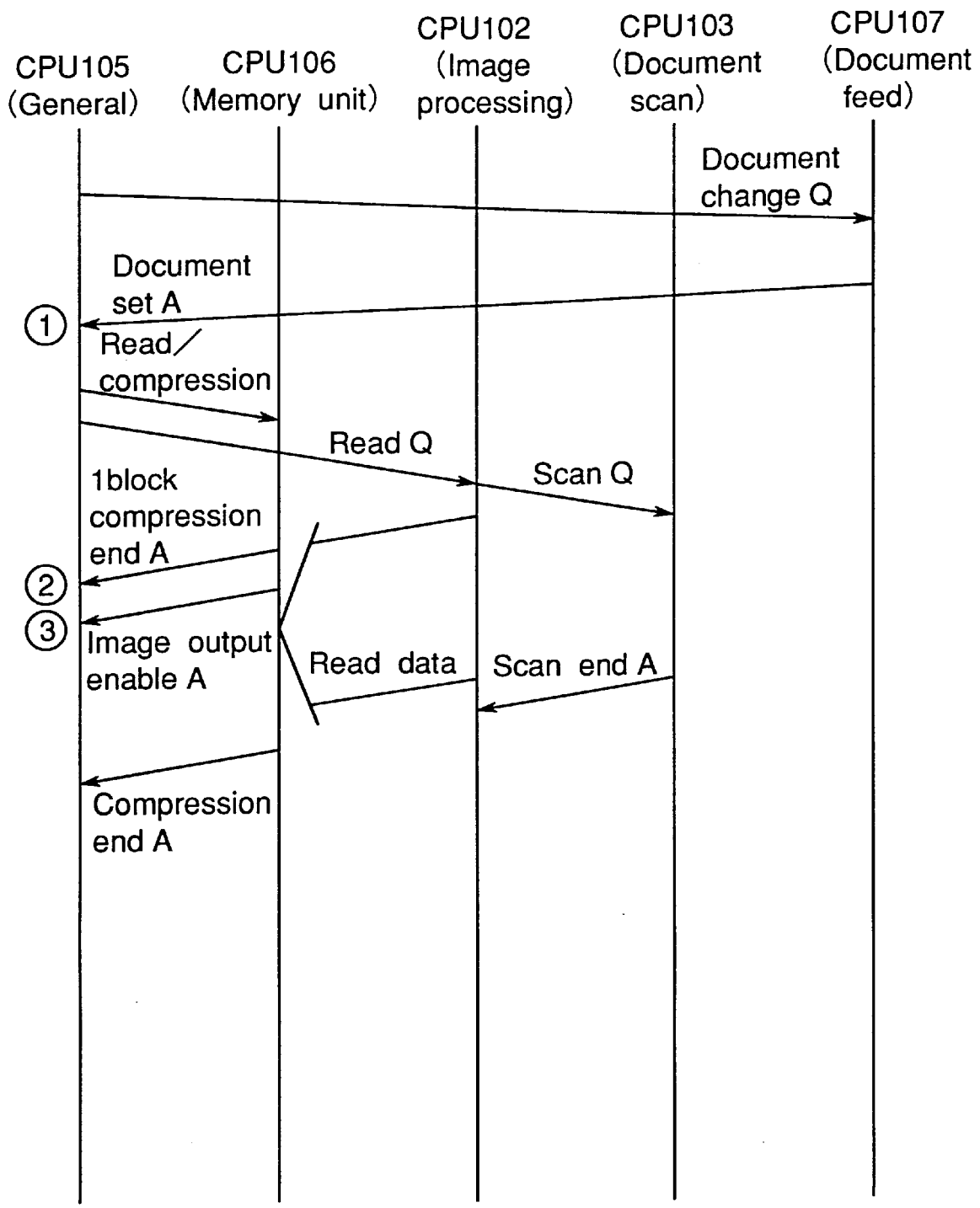
FIG. 5 is a diagram of a general sequence when an image is read.
Figure 6:
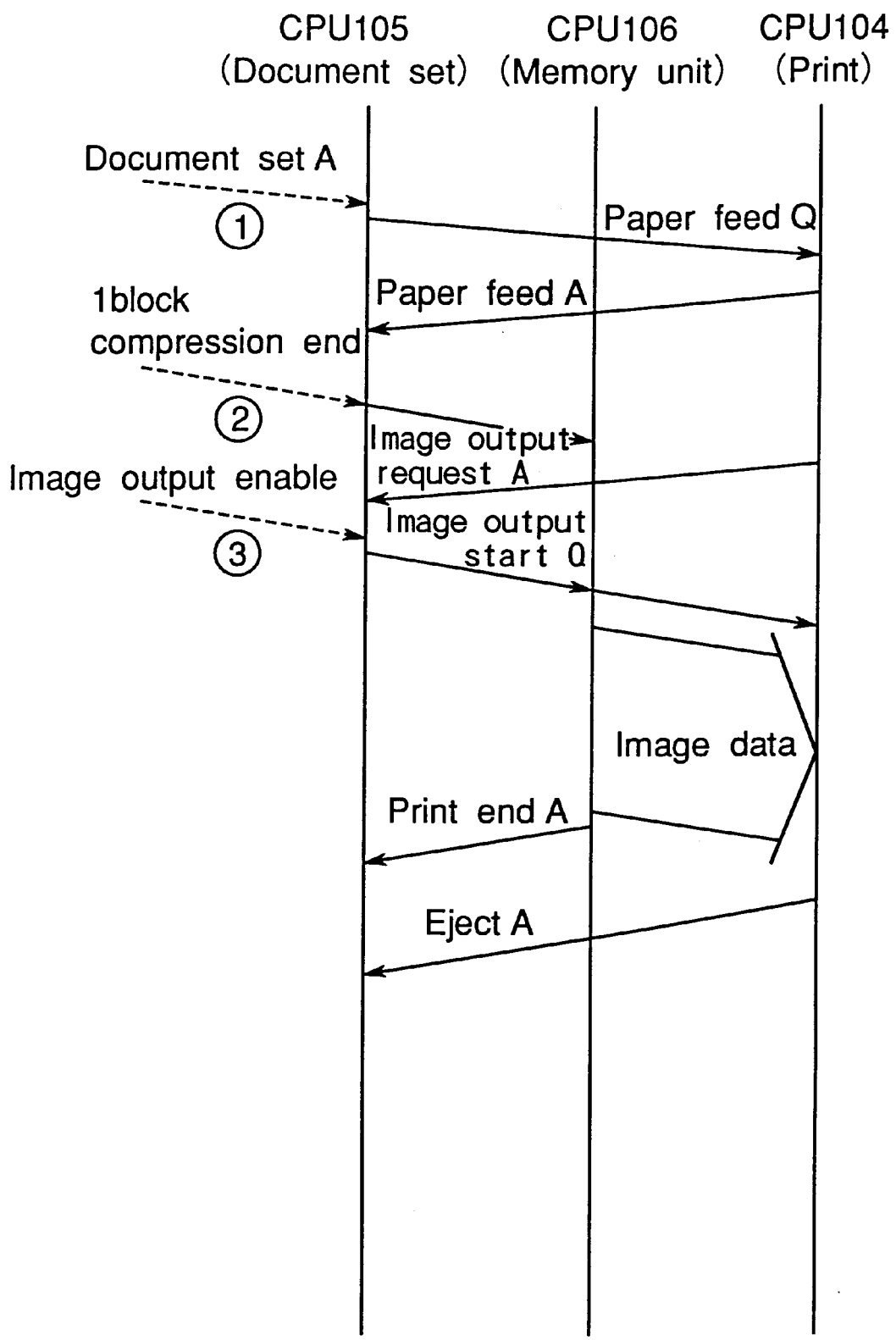
FIG. 6 is a diagram of a general sequence when an image is printed.

In the memory unit 30, the compression device 302 and the expansion device 304 have the same structure in the memory unit 30 of this embodiment. Then, the compression speed and the expansion speed are the same for the same data. When image data D3 of one page is generated in the output page memory 306, the image data D3 are sent to the print processor. The data transmission shown with a wide arrow in FIGS. 5 and 6 are performed independently of each other and in parallel for increasing copy speed. The image data are transmitted by a direct memory access controller (not shown). The amount of transmitted data to a memory device is confirmed by a transmission counter in the direct memory access controller.

Figure 4:
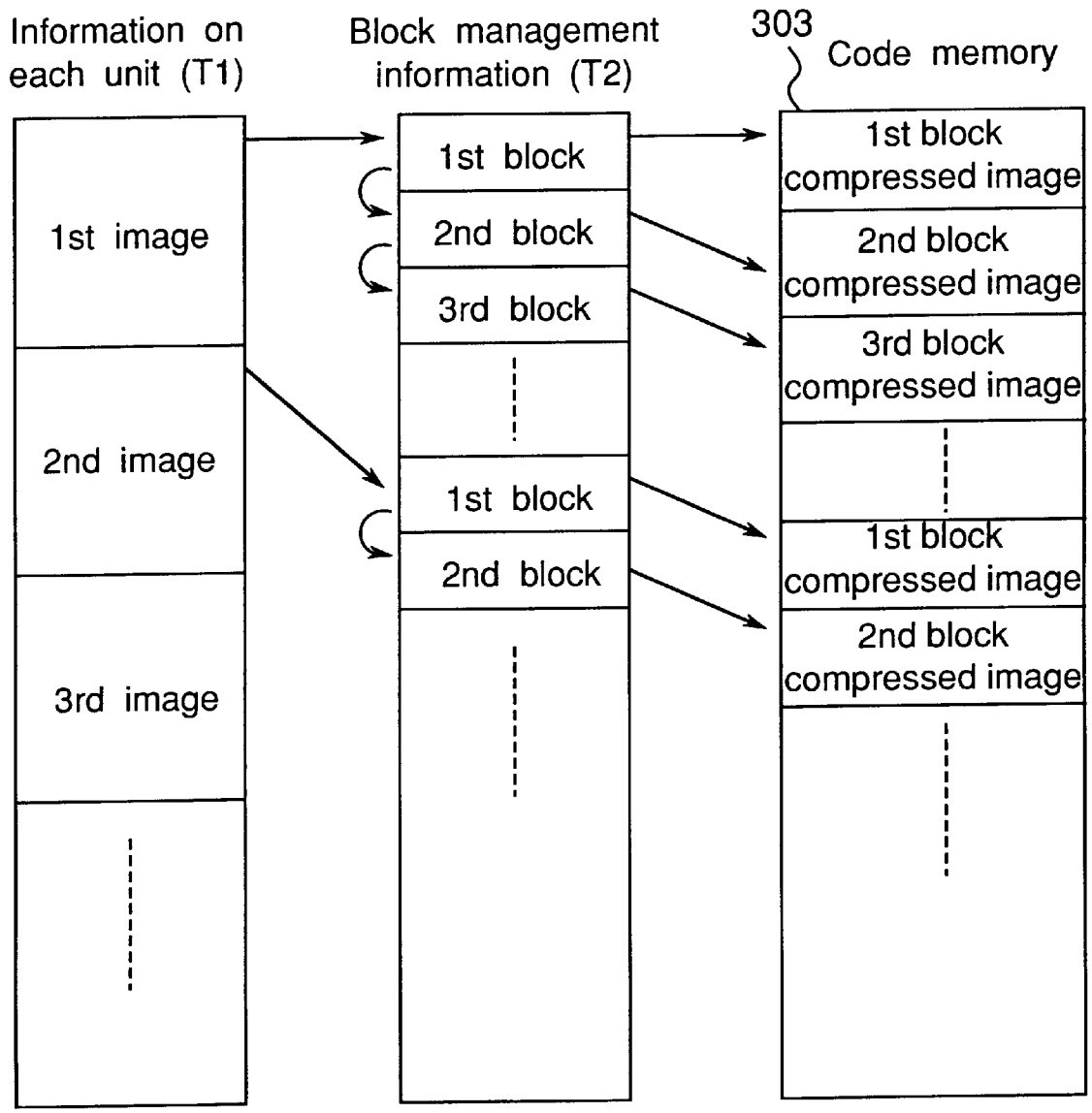
FIG. 4 is a diagram on a relation between the code management table and the code memory.

When the document image is stored temporarily, the code memory 303 is managed by a code management table provided in the RAM 126. FIG. 4 shows a relation between the code management table and the code memory 303. When the image data are compressed, the image stored in the code memory are compressed in the unit of block. Then, as shown in the right side in FIG. 4, the image data are stored in the code memory 303 in the unit of block by dividing the image data. Therefore, the code management table has a block management table T2 for storing information in the unit of block and an image unit information table T1 for storing information in the unit of image data. The image unit information table T1 stores information such as image size before compression, size of compressed image, the position of block unit information in the table T2 in the unit of page. The block management table T2 stores information such as the position of divided image data, size of compressed image and measured compression time in the unit of block.

Next, operation sequence of the copying machine on reading and on printing is explained mainly on request commands (Q), reports (A) between the CPUs 101–107 and data flow. FIG. 5 shows a general sequence when a document is read. In this sequence, the automatic document feeder 500 is used. First, the CPU 105 controlling the entire sequence requests document change to the CPU 107 which controls the automatic document feeder 500. Then, the CPU 107 starts to feed a document, and the size thereof as a parameter is sent as document set report.

When the size is determined, the CPU 105 issues read and compression requests to the CPU 106 at the same time. Further, the CPU 106 sends read request to the CPU 102 which controls image processing. Then, the CPU 102 requests scan to the CPU 103 which controls the image reader. Then, the scan of the document is started. When the scanner 19 comes to the image area, read data (image data D2) are sent from the image signal processor 20 to the memory unit 30 according to image processing mode set by the CPU 102.

The CPU 106 which controls the memory unit 30 divides beforehand the input page memory 301 into blocks in correspondence to the document size. The CPU 106 checks the status of image reading to set addresses of the compression device 302 and the code memory 303 in the predetermined timings and to activate various parts. Then, compression is performed, and the code data are stored in the code memory 303. At the same time, a time from start to end of compression is measured and it is stored in the block information management table T2 in the code management table in the RAM 126.

When compression of the first block completes, the CPU 106 sends a one-block compression end report to the CPU 105. Further, the CPU 106 calculates a timing which does not make printing get ahead of expansion based on a sum of worst compression times per one block in correspondence to the read size, the worst expansion time, and print time needed to output the image. Then, when it is the timing, the CPU 106 sends an image output enable signal to the CPU 105.

Further, when compression of all the blocks completes, the CPU sends compression end report to the CPU 105.

FIG. 6 shows a general sequence on printing. An image is printed on a paper based on the image data D3 read from the output page memory 306. FIG. 6 is closely related to FIG. 5.

When the CPU 105 receives a document set report, the document size is determined. Then, the CPU 105 decides which paper cassette 80a, 80b has to be selected, and requests paper feed to the CPU 104 with a parameter on paper cassette. The selection of the paper cassette is explained further. It is decided whether the document is vertical (T) or horizontal (Y). If papers of the same size are set in the paper cassettes 80a and 80b in the vertical and horizontal directions, a paper having the same direction as the document is selected, the document which makes it possible to expand without rotation in order to advance a timing to start image output. However, if the current mode is multi-copy mode wherein the image is printed on two or more papers, a paper in the horizontal direction is selected irrespective of rotation. (In the above-mentioned copy mode is single-copy mode wherein the image is printed on a paper.) That is, if the paper selected without rotation is a paper in the vertical direction, the paper in the horizontal direction is selected in order to shorten the total print time by taking the multi-copy into account. Hereinafter, printing without image rotation is only explained.

When paper feed is started, the CPU 104 returns a paper feed report to the CPU 105. When the paper reaches to the timing roller and preparation for image output is completed, the CPU 104 sends an image output request to the CPU 105.

When the CPU 105 receives the one-block compression end report, it requests data expansion to the CPU 106.

By referring to the code management table, the CPU 106 sets read address from the code memory, the amount of data and the like in the unit of block, and activates each part. Then, expansion is started, and image data of one block is written to the output page memory 305.

After activating the expansion, if the image output enable signal is received from the CPU 106, the CPU 105 requests image output start to the CPU 106 and to the CPU 104. Then, the CPU 106 sets bus connection for the internal hardware portions in order to output image data D3 from the output page memory 306 to the print processor 40. Further, the CPU 104 activates paper feed from the timing roller 82 to make the top end of the image to the image output start timing. Then, the image data D3 read from the input page memory 304 are output to the print processor 40 and printing is performed.

When printing is completed, the CPUs 106 and 104 sends print end report and eject end report to the CPU 105. Then, the CPU 105 sends memory clear request to the CPU 106 if necessary.

As explained above, a page of image data is divided into blocks, and compression and expansion are performed in the unit of block. (In the example, one page of image data is divided into three blocks.) When compression of the first block is completed, expansion becomes possible, and expansion of each block is performed successively. An image output start timing is set by considering the worst compression speed and the worst expansion speed in correspondence to read size on data not yet compressed. Then, if it is the image output start timing, data output is started from the output page memory 306 to start printing, so that print does not get ahead of compression and expansion for each block. In the examples shown in FIGS. 7 and 8, image output is started during compression of the second block.

Figure 7:
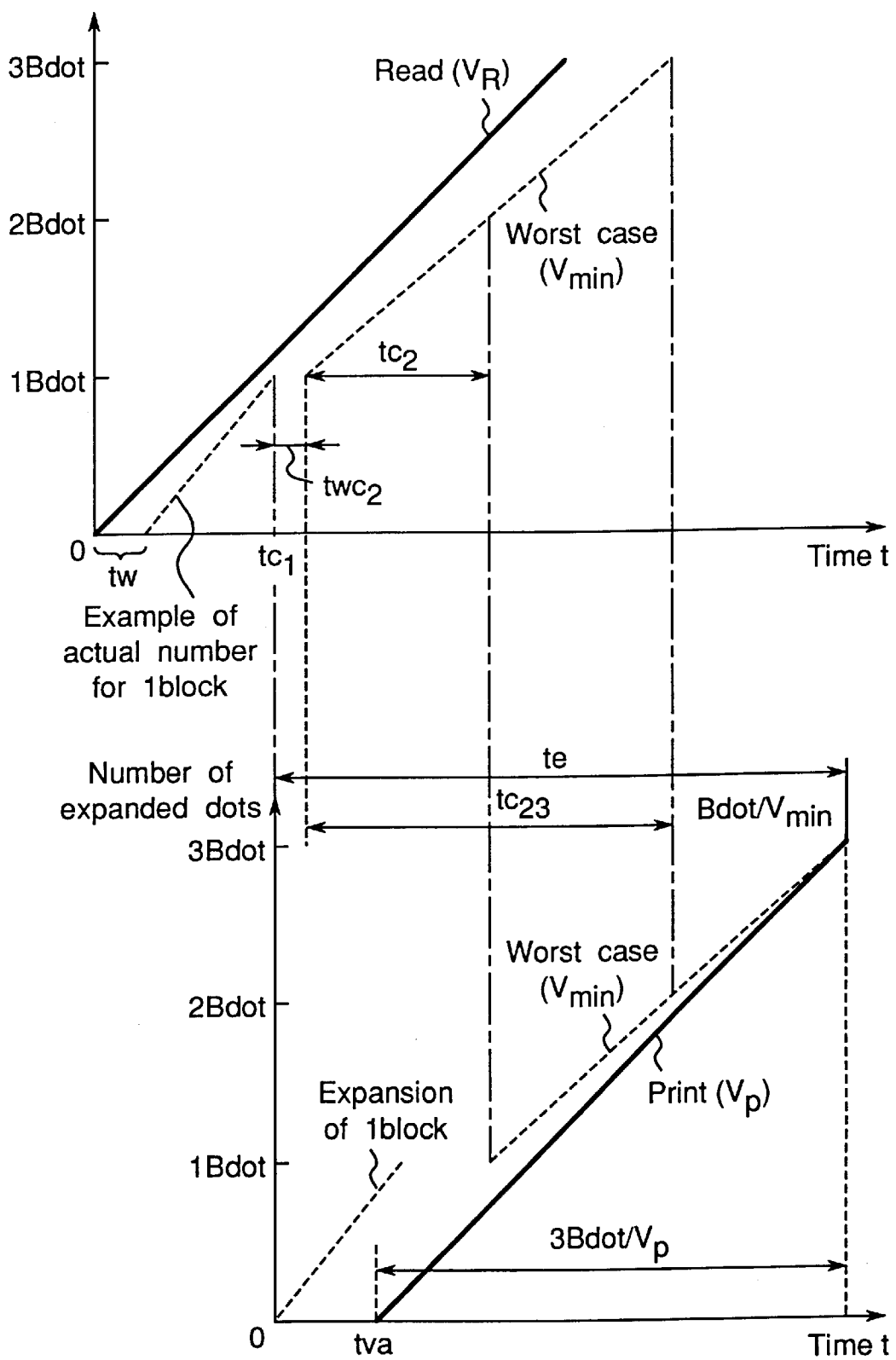
FIG. 7 is a diagram on a relation between reading (compression) and print (expansion) when print speed is slower than the worst expansion speed.
Figure 8:
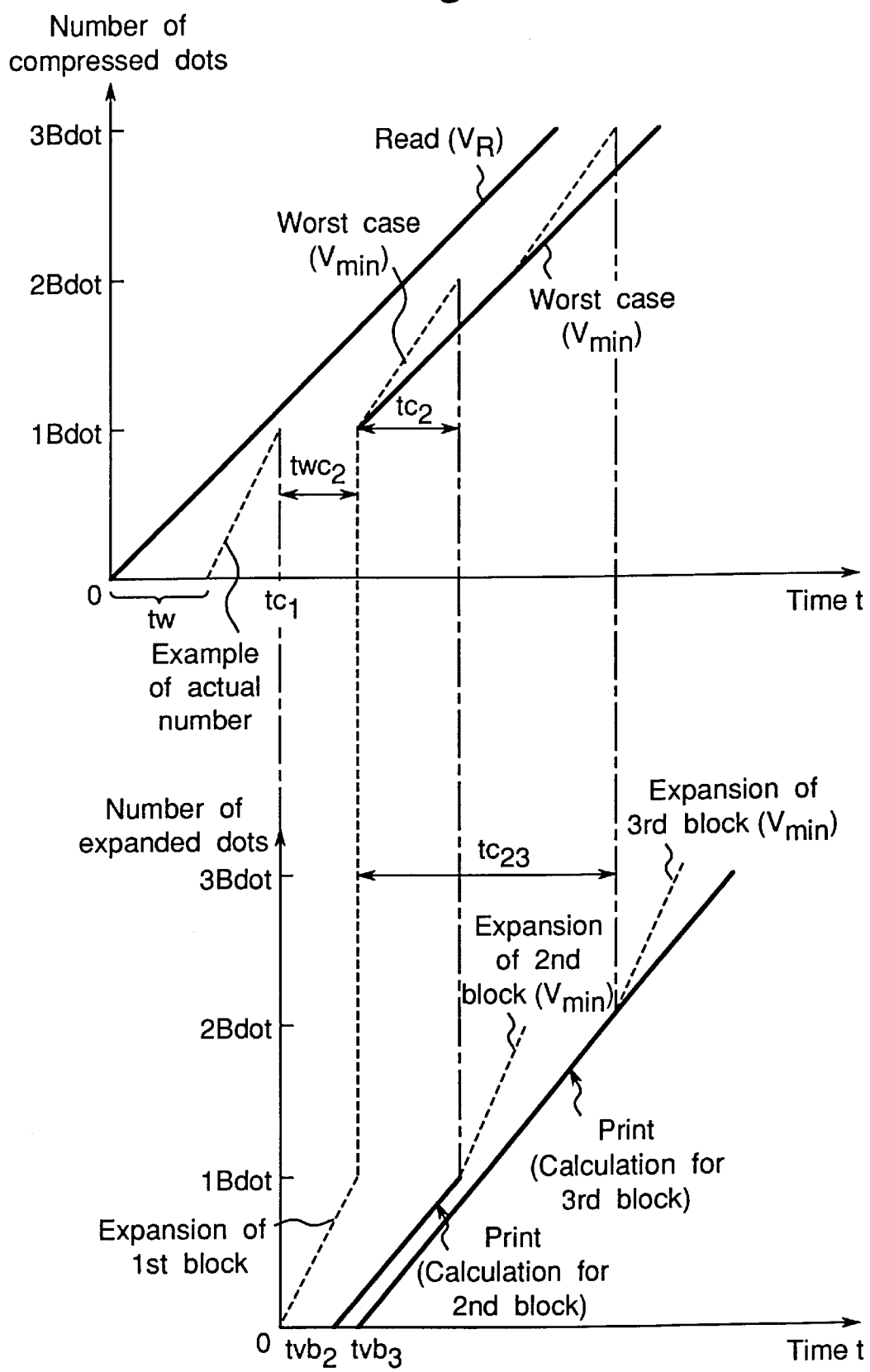
FIG. 8 is a diagram on a relation between reading (compression) and print (expansion) when print speed is faster than the worst expansion speed.

Next, an algorithm is explained for setting the image output start timing so that printing does not get ahead of expansion, by the CPU 106 which controls the memory unit 30. FIGS. 7 and 8 show diagrams for explaining examples of the calculation. After the compression of the first block completes, the calculation is performed during the compression by the compression device 302, and the obtained image output start timing is set. The calculation can be performed until the compression of the first block ends. However, by using the measured value of the compression end time of the first block, image output start timing can be set earlier. Further, because expansion becomes possible after completion of the compression of the first block, image output will not be delayed by calculation after completion of the compression of the first block. Then, the image output start timing is calculated based on the measured compression completion time $tc_1$ on the compressed data. Parameters used in the calculation include document size, dot number Blot per one block, input speed $V_E$(bps) from the image reader in correspondence to the document size (input time for inputting image data to the input page memory 301 based on Bdot and $V_R$), the maximum compression (or expansion) speed $V_{max}$(bps) (the shortest compression time for compressing image data is calculated based on Bdot and $V_{max}$), the worst compression (or expansion) speed $V_{min}$ (bps) (the longest compression time for compressing image data is calculated based on Bdot and $V_{min}$), and print speed $V_{out}$ (bps) is calculated based on Bdot and $V_{out}$).

Further, in a previous copying machine having the rotation function, if papers in the vertical direction and in the horizontal direction having the same size determined by the document size and the magnifying power are provided in the paper cassettes 80a and 80b, the paper in the horizontal direction is selected because image output time from image output start to image output end is shorter. Then, even if the paper in the horizontal direction is selected with image rotation function in the first copy, the image cannot be output until a page of document is completed to be read with the image rotation. Therefore, even if the paper having the shorter image output time is selected, a long time is needed from image read start to image output start as a whole.

In this embodiment, if papers in the vertical direction and in the horizontal direction having the same size are provided in the paper cassettes 80a and 80b, a paper having the same direction as the document is selected, because image rotation is avoided. Thus, image output start timing is advanced.

However, in a case of multi-copy mode for copying two or more sheets of paper, a paper in the horizontal direction is selected irrespective of use of rotation. That is, even if the paper selected without rotation is a paper in the vertical direction, a paper in the longitudinal direction is selected in order to shorten a total print time in the multi-copy. In the explanation below, print without image rotation is explained.

(A) Compression Start Timing According to a Relation Between Input Speed and Compression Speed Compression should not get ahead of read in a relation between transmission speed (input speed) from the image reader to the input page memory 301 and compression speed of the data in the input page memory 301 by the compression device 302. Then, a timing of the compression start by the compression device 302 has to be calculated by assuming the maximum compression speed. Here, $V_R$ (bps) represents input speed from the image reader in correspondence to the document size, Bdot represents dot number per one block, and $V_{max}$(bps) represents the maximum compression (expansion) speed. Then, $Bdot/V_R$ is a time needed to input dots of one block to the input page memory 301, and $Bdot/V_{max}$ is a time needed to compress dots of one block. The maximum compression speed $V_{max}$ is faster than the input speed $V_R$. Therefore, in order to prevent for compression to get ahead of read, a time "tw" from the start of read of one block to a timing when compression can be started is set as follows:

$$tw = Bdot/V_R - Bdot/V_{mag}. \quad (1)$$

(B) Compression, Expansion and Image Output at the Second Block and Thereafter

At the second block and thereafter, read data are accumulated successively at input speed $V_R$ in the input page memory 301. Further, data in the input page memory 301 are also read successively, compressed by the compression device 302 to be accumulated in the code memory 303.

When compression data of one block are accumulated in the code memory 303, the compressed data are read and expansion is started by the expansion device 304 so that image data are accumulated in the output page memory 306.

Output start timing "tva" of image data from the output page memory 306, that is, the image output start timing is calculated so that image output (printing) is completed when expansion of the last block is completed. In the calculation, compression should not get ahead of read, expansion should not get ahead of compression, and image output should not get ahead of expansion.

In the calculation, a time needed to compress data in an block not yet compressed is calculated. There are two cases: A case when the print speed $V_P$ is higher than the worst compression speed $V_{min}$ (FIG. 7 shows an example), and another case when the print speed $V_P$ is lower than the worst compression speed $V_{min}$ (FIG. 8 shows an example). Then, the calculation is explained in the two cases.

(B1) A Case when the Print Speed $V_P$ is Higher than the Worst Compression Speed $V_{min}$ As shown in FIG. 7, in the calculation of the image output start timing tva, first, times needed for compression of the second and third blocks and a time needed for expansion of the third block are calculated. Next, the end time of expansion of the final block is determined. Next, a time $3Bdot/V_p$ needed for printing is subtracted, to determine the image output start timing tva. Thus, printing is started when the time tva passes after the time $tc_1$ when the compression of the first block completes, and it is completed when the expansion of the last block completes.

(B1-1) Time From the End of Compression of the First Block to the Start of the Compression of the Second Block A time (measured time) when the compression of the first block is completed is denoted as $tc_1$ (refer to FIG. 7). After $Bdot/V_R$ needed to read data of one block elapses, the data in the second block is read. Here, two cases are possible on the compression start timing of the second block. If $$tc_1 - Bdot/V_R > tw,$$

or $$tc_1 > Bdot/V_R + tw,$$

compression does not get ahead of read even at the highest compression speed, and compression of the second block can be started at once. That is, is $twc_2$ represents a time from the end of compression of the first block ($tc_1$) to the start of compression of the second block, $$twc_2 = 0. \tag{2-1}$$

On the other hand, if $$tc_1 - Bdot/V_R < tw,$$

or $$tc_1 < Bdot/V_R + tw,$$

expansion may get ahead of read, and compression of the second block cannot be started readily. (Compression of the second block in FIG. 7 corresponds to this case.) Then, a time $tcw_2$ to the start of compression of the second block is as follows:

$$twc_2 = Bdot/V_R + tw - tc_1. \tag{2-2}$$

(B1-2) Time From the Start of Compression of the Second Block to the Completion Thereof of the Third Block After compression of the second block is started, compression can be started irrespective of a relation between the worst compression speed and the read speed. Then, a time $tc_2$ from start to end of the compression of the second block is determined as shown below by considering the worst compression speed $V_{min}$ as follows:

$$tc_2 = Bdot/V_{min}. \tag{3}$$

When $tc_2$ elapses, expansion of the second block is started.

Though compression of the second block can be started readily, there are two cases on the start of the compression of the third block and blocks thereafter according to a relation between read speed $V_R$ and the worst compression speed $V_{min}$.

If read speed $V_R$ is higher than the worst compression speed $V_{min}$, that is, if $V_{min} \leq V_R$, the compression of the second block and the third block is performed successively. Then, a time $tc_{23}$ from the start of compression of the second block to the end of the compression of the third block depends on the worst compression speed $V_{min}$ if as follows:

$$tc_{23} 2Bdot/V_{min}. \tag{4-1}$$

(FIG. 7 shows this case as to the relation between the worst compression speed and the read time.)

On the other hand, if read speed $V_R$ is slower than the worst compression speed $V_{min}$, that is, if $V_{min} > V_R$, the time until the end of the compression of the second block depends read speed $V_R$, and the time until the end of the compression of the third block depends the worst compression speed $V_{min}$. Then, $tc_{23}$ depends on the read speed $V_R$ and the worst compression speed $V_{min}$ as follows:

$$tc_{23} = Bdot/V_R + Bdot/V_{min}. \tag{4-2}$$

(FIG. 8 shows this case as to the relation between the worst compression speed and the read time.)

(B1-3) Conclusion

Expansion of the last block (the third one) is started after the compression of the last block completes. The expansion time of the last block is $Bdot/V_{min}$ by taking the worst expansion speed $V_{min}$ into account. Therefore, a time "te" from the start of the first block to the end of the last block in the expansion is determined as follows:

$$te = twc_2 + tc_{23} + Bdot/V_{min}. \tag{5}$$

As to a time tva from the start of the expansion of the first block to the start of image output, the end of the expansion of the last block is set to agree to the end of the image output. Then, the image output is started before the end of the expansion of the last block. Therefore, a time $Bdot/V_p$ is needed for printing an image of one page, the time tva is determined as follows:

$$tva = te - 3Bdot/V_p. \tag{6}$$

Thus, a timing of image output when the print speed $V_p$ is higher than the worst compression time $V_{min}$, that is, a time from the end of the compression of the first block to the start of image output, is determined by calculating tva.

In this example, one page of image is divided into three blocks. However, when the number of blocks is increased further, the image output start timing tva can be calculated easily by making the end of the expansion of the last block agree to the end of the image output, before the end of the expansion of the last block.

(B2) A Case when Print Speed is Lower Than the Worst Compression Speed

FIG. 8 shows an example of this case. A timing of compression start of the second block is determined similarly to the above-mentioned case when the print speed $V_p$ is higher than the worst compression speed $V_{min}$. A different point from the above case is that because the print speed is lower than the worst compression speed, printing does not get ahead of printing even if printing is started at the same time of the expansion of each block. Therefore, it is not needed to estimate the expansion time, and only the compression time is estimated. Then, calculation is performed in each block as explained below.

(B2-1) Calculation of Image Output Start Time by Considering the First Block

Because image output can be started at the same time as expansion is started, a time "$tvb_1$" from the start of expansion to the start of image output is zero.

(B2-2) Calculation of Image Output Start Time by Considering the Second Block

The start of expansion of the second block is set to agree to the end of print of the first block. The time "twc$_2$" from the end of compression of the first block to the start of compression of the second one and the time "tc$_2$" from the start to the end of compression of the second block have already been calculated in B1 as Eqs. (2-1), (2-2) and (3). Expansion and image output can be started readily when compression of the second block completes. Therefore, a time "tvb$_2$" from the start of expansion of the first block to the start of print of the second block is determined as follows:

$$tvb_2 = twc_2 + tc_2 - Bdot/V_p. \qquad (7)$$

(B2-3) Calculation of Image Output Start Time by Considering the Third Block

The start of expansion of the third block is set to agree to the end of print of the second one. The time "twc$_2$" from the end of compression of the first block to the start of compression of the second one and the time "tc$_{23}$" from the start of compression of the second block to the end of compression of the third block have already been calculated in B1 as Eqs. (3), (4-1) and (4-2). Expansion and image output can be started readily when compression of the third block completes. Therefore, a time "tvb$_3$" from the start of expansion of the first block to the start of print of the third block is determined as follows:

$$tvb_3 = twc_2 + tc_{23} - 2Bdot/V_p. \qquad (8)$$

(B-3) Conclusion

The image output timing when the print speed is lower than compression speed is determined by selecting the slowest timing among the image output start timings tvb$_2$, tvb$_3$ for all the blocks. In the calculation of the image output start timings, for the second block, the start of expansion of the second block is set to agree to the end of print of the first one, and for the third block, the start of expansion of the third block is set to agree to the end of print of the second one, and so on. In the example shown in FIG. 8, "tvb$_3$" is set as the image output start timing.

In this embodiment, one page of image is divided into three blocks. However, even if the number of the blocks is increased further, the image output start timing "tva" can be calculated easily by calculating the image output start timing for each block so that the start of expansion of the block agrees to the end of print of the previous block.

FIGS. 9A and 9B, 10 and 11 are flowcharts of compression, expansion and output by the CPU 105 controlling the entire system. The calculation of the image output start timing by estimating compression time of document image data is performed during compression.

Figure 9A:
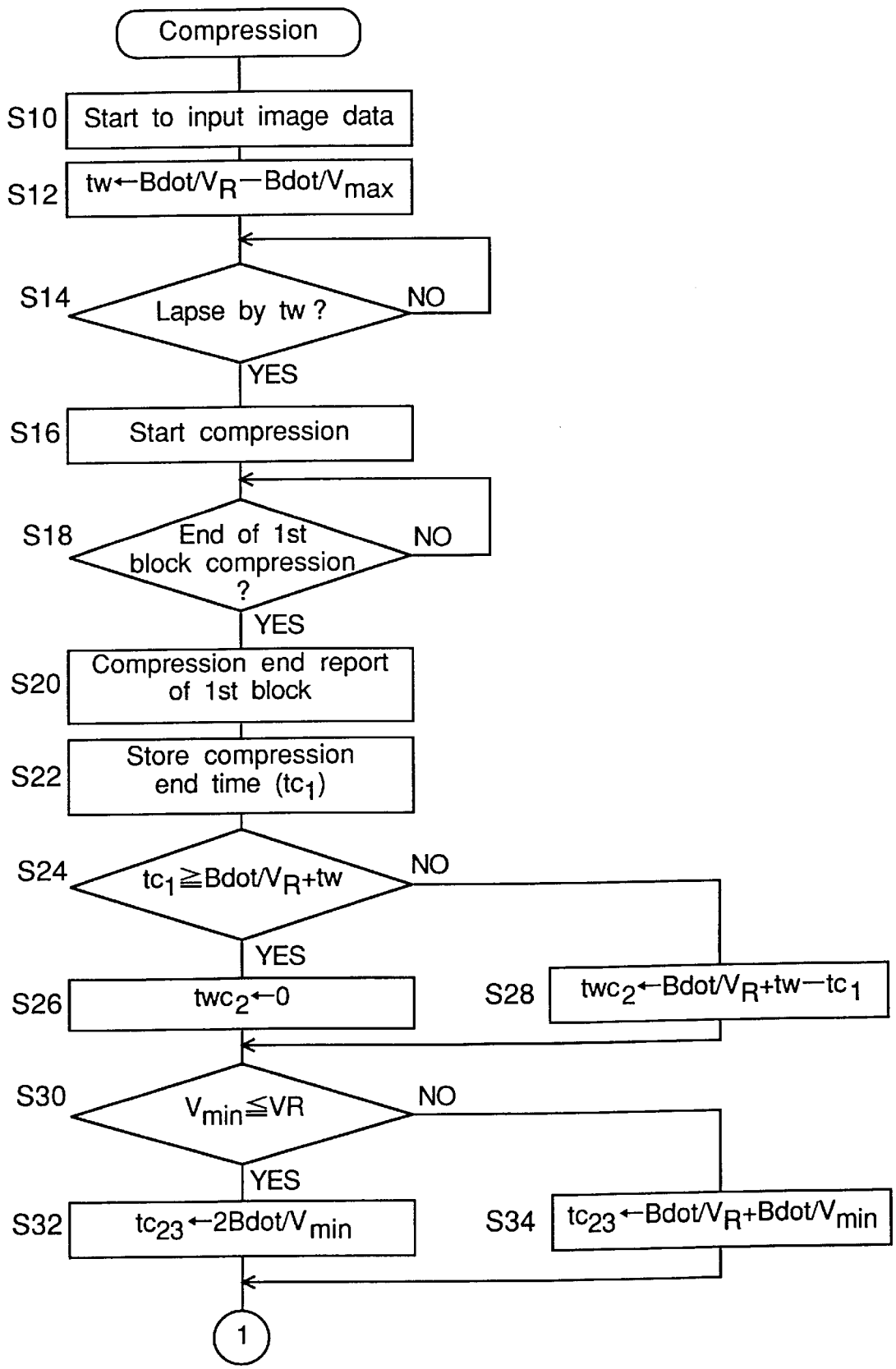
FIGS. 9A and 9B are flowcharts of compression.
Figure 9B:
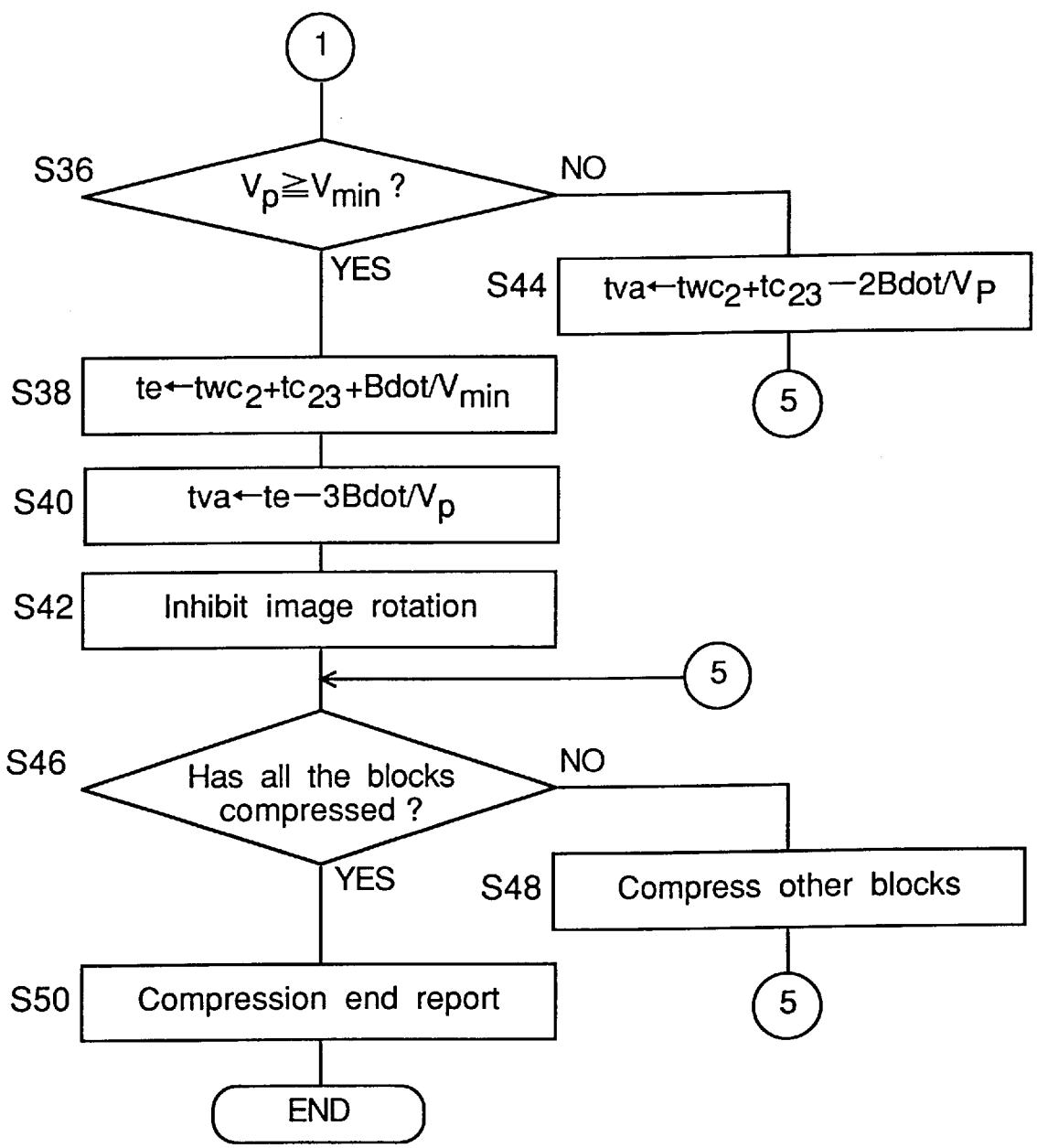

FIGS. 9A and 9B are flowcharts of compression. First, image data input is started (step S10), and the time "tw" from the start of read of a block to a timing when compression can be started is set as follows (step S12):

$$tw = Bdot/V_R - Bdot/V_{mag}, \qquad (1)$$

where $V_R$ (bps) represents input speed from the image reader in correspondence to the document size, Bdot represents dot number per one block, and $V_{max}$(bps) represents the maximum compression (expansion) speed. After the time "tw" elapses (YES at step S14), compression is started (step S16).

When compression of the first block ends (YES at step S18), a compression end report of the first block is sent to the CPU 105 (step S20), and measured compression end time "tc" is stored (step S22).

Next, it is decided if the following relation $$tc_1 > Bdot/V_R + tw,$$

is satisfied or not (step S24). If the decision at step S24 is YES, $$twc_2 = 0 \qquad (2-1)$$

(step S26) where tcw$_2$ denotes a time from the end of compression of the first block (tc$_1$) to the start of compression of the second block. On the other hand, the decision at step S24 is NO, tcw$_2$ is set as follows (step S28):

$$twc_2 = Bdot/V_R + tw - tc_1. \qquad (2-2)$$

Next, it is decided if $$V_{min} \leq V_R$$

(step S30). If the decision at step S30 is YES, the time tc$_{23}$ from the start of compression of the second block to the end of the compression of the third block depends on the worst compression speed $V_{min}$ is set as follows (step S32):

$$tc_{23} = 2Bdot/V_{min}. \qquad (4-1)$$

On the other hand, if the decision at step S30 is YES, the time tc$_{23}$ is set as follows (step S34):

$$tc_{23} = Bdot/V_R + Bdot/V_{min}. \qquad (4-2)$$

Next, it is decided on print speed $V_p$ if $$V_p \geq V_{min}$$

(step S36). If print speed $V_p$ is higher than the worst compression speed ($V_{min}$) (YES at step S36), the time te from the start of the first block to the end of the last block in the expansion is determined as follows:

$$te = twc_2 + tc_{23} + Bdot/V_{min} \qquad (5)$$

(step S38). Then, the time tva from the start of the expansion of the first block to the start of image output is determined as follows (step S40):

$$tva = te - 3Bdot/V_p, \qquad (6)$$

and the image rotation is inhibited (step S42). However, if the multi-copy mode is set for printing an image on two or more sheets of paper, a paper in the horizontal direction is selected, and image rotation is performed if necessary.

On the other hand, if print speed $V_p$ is lower than the worst compression speed ($V_{min}$) (NO at step S36), the time tva is set as follows (step S44):

$$tva = twc_2 + tc_2 - 2Bdot/V_p. \qquad (8)$$

Next, it is decided if compression of all the blocks end or not (step S46). If it is decided that compression has not yet been completed (NO at step S46), a remained block is compressed (step S48), and the flow returns to step S46. Otherwise a compression end report is sent to the CPU 105 (step S50), and compression processing is completed.

Figure 10:
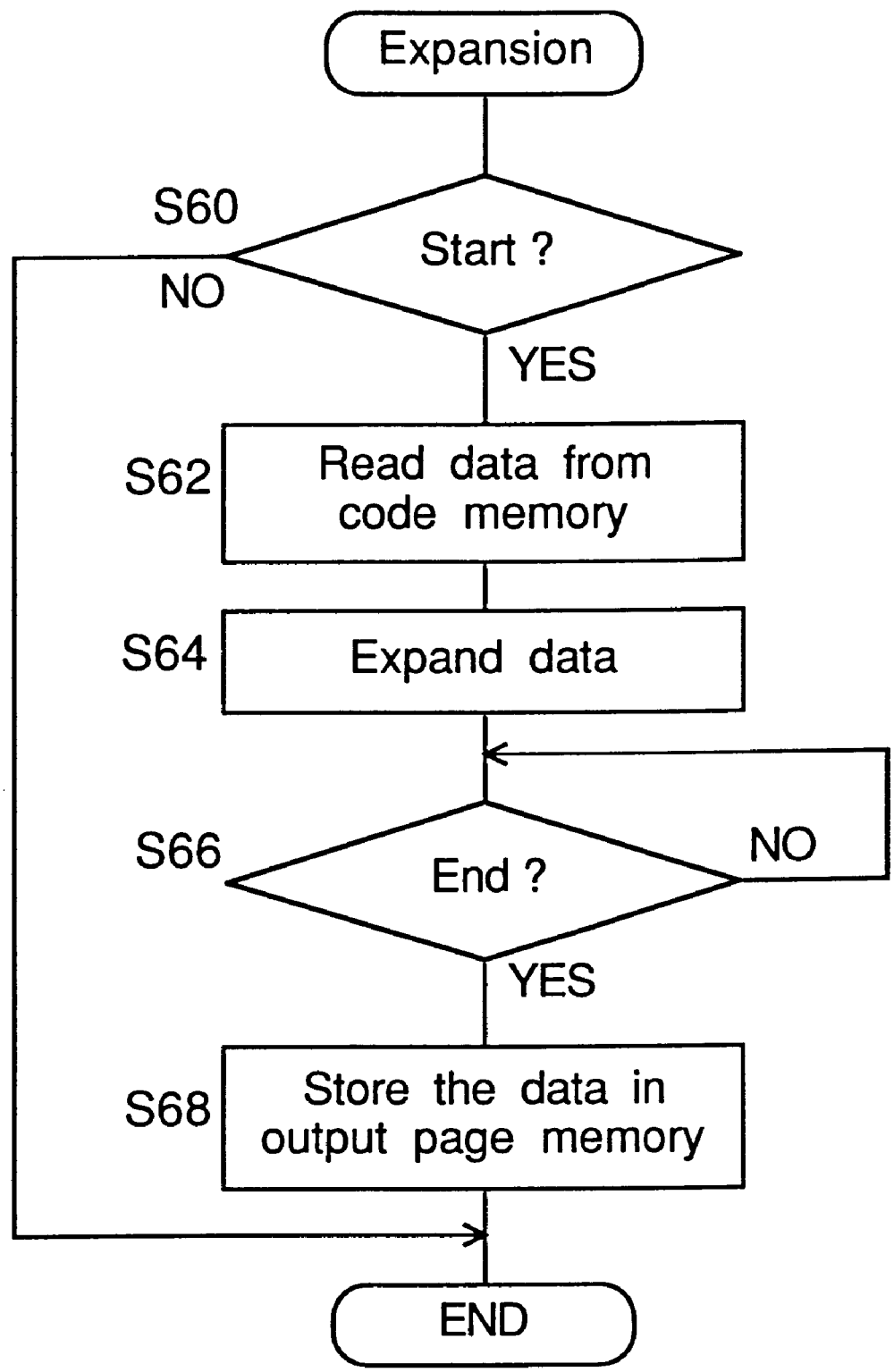
FIG. 10 is a flowchart of expansion.

FIG. 10 is a flowchart of expansion. First, it is decided if it is an expansion start timing or not (step S60). If compression of at least one block is completed, expansion is possible. Then, it is decided here if the compression of the first block is completed or not.

If it is decided that it is an expansion start timing (YES at step S60), data are read from the code memory 303 (step S62), and the data are expanded (step S64). If the expansion is completed (YES at step S66), the expanded data are stored in the output page memory (step S68), and the expansion processing is completed.

Figure 11:
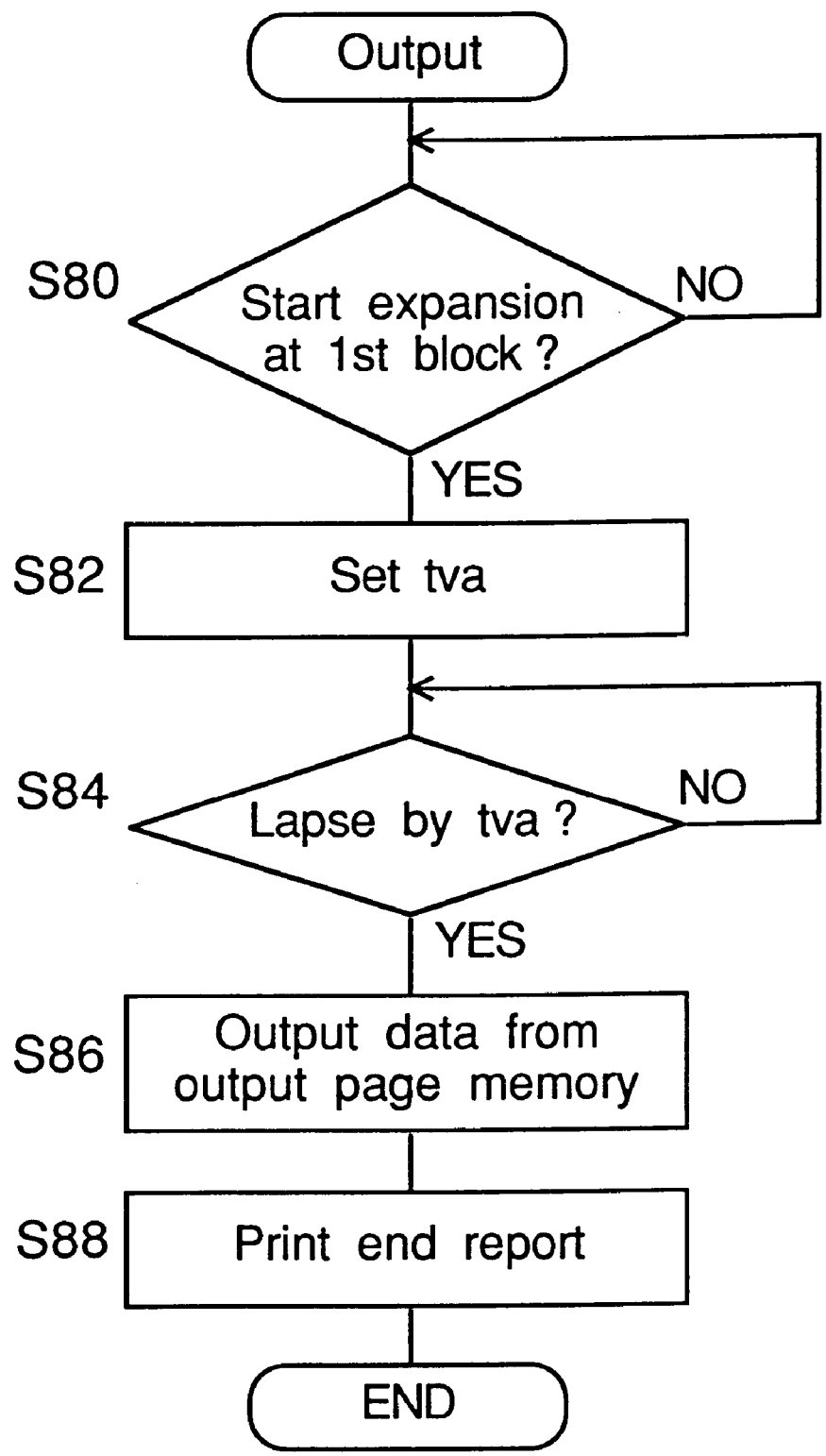
FIG. 11 is a flowchart of output processing.

FIG. 11 is a flowchart of output processing. First, if expansion of the first block is decided to be started (YES at step S80), the time tva from the start of the expansion of the first block to the start of image output is calculated based on the compression times of each block, dot number, the worst compression time and read time (refer to Eqs. (1), (2) and (3)) and the slowest time among the expansion start times of the blocks is set as the image output start timing (step S82). Then, if the time tva is decided to elapse (YES at step S84), data are started to be read from the output page memory 306 (step S86), and when all the data are output, a print end report is sent to the CPU 105 (step S88), and the output processing is completed.

As explained above, read from the output page memory 306 is started by estimating the time needed for expansion of each block. Therefore, read does not get ahead of expansion. Further, because read can be started before end of expansion of one page, first copy speed is improved, and a throughput of copy operation can be increased.

Even if papers of the same size as the documents in the vertical direction or horizontal direction are provided, the paper which does not need image rotation is forced to be selected. Therefore, it is advantageous that image output can be made faster irrespective of the direction of a document.

Next, a digital copying machine of a second embodiment of the invention is explained. The digital copying machine has the same structure as the first embodiment explained with reference to FIGS. 1–6. However, image output timing is set differently in this embodiment so that a next image output can be started always within a paper supply time in the printer.

In the memory unit 30, the CPU 106 calculates image output start timing based on the worst compression time in correspondence to read data size and print time needed for image output, so that print does not get ahead of expansion. In the calculation, the image is divided into a plurality of blocks and image output start timing is calculated for each block so that print does not get ahead of expansion. Then, at the image output start timing, image output enable report is sent to the CPU 105 before expansion of all the image of one page is completed, and image output is started from the output page memory. Thus, the throughput of copy is improved.

The concept of the calculation of the image output start timing is explained as follows: When expansion is started, a time from expansion start to image data output from the output page memory 306 is set so that print does not get ahead of expansion, by estimating expansion time for data not yet expanded. The expansion time is estimated for each block, and the image output start timing is determined based on the estimated expansion times and the time of image data output. The image data output time is calculated based on the measured compression time for each block and a time needed for printing. In the calculation, parameters are taken into account such as dot number of each block, the worst compression time, the worst expansion time and image output speed (print speed $V_p$). The number of the blocks is determined based on the detected document size and the size of one block.

Estimation of the expansion time is different among the blocks. For example, in the first block for which expanded data are written to the output page memory 306 and read therefrom at the same time, the image output start timing is estimated with use of the (known) worst expansion time $V_{min}$ so that print does not get ahead of expansion when expansion of the first block is completed.

If compression time by the compression device is equal to expansion time by the expansion device, as in this embodiment, expansion time is the same as compression time. That is, in the memory unit 30, compression time by the compression device 302 is equal to expansion time by the expansion device 304. Because expansion time can be estimated from compression time, expansion time can be estimated from the measured compression time. For the first block, the image output start timing $tx_1$ can be calculated with the worst compression speed. For the second block and blocks thereafter, expansion start times ($tx_2$, $tx_3$, ... ) are calculated so that print does not get ahead of expansion even if calculation is performed with the worst expansion speed and the measured compression time for the block just before the current block.

However, estimation method is not limited to the above-mentioned one. For example, compression rate is calculated from the image size Bdot and compression size for each block, and expansion time is estimated according to the operation speed of the compression/expansion device with the compression rate.

Next, an algorithm is explained with reference to FIG. 12, wherein image output start timing is calculated so that print does not get ahead of expansion. It is assumed that the compression device 302 and the expansion device 304 have the same structure and that compression and expansion are performed at the same speed. In an example shown in FIG. 12, an image of one page is divided into four blocks, and the measured values of compression speed is the same for all the blocks, and the average expansion speed is shown. The number of dots to be expanded is denoted as $Bdot_1$, $Bdot_2$, $Bdot_3$ and $Bdot_4$ for the first to fourth blocks, wherein $Bdot_1$, $Bdot_2$ and $Bdot_3$ are the same, but $Bdot_4$ is smaller than the others. Expansion start time t is assumed to be zero, $V_{min}$ (bps) denotes the worst compression speed (expansion speed), and $V_p$(bps) denotes print speed.

First, calculation on the first block is explained, wherein $tx_1$ denotes image output start time which does not make print get ahead of expansion when expansion of the first block is completed. The measured compression time represents a period from the start to the end of compression of the first block, and if it is converted to expansion speed, the average expansion speed for the block is obtained. However, because compression speed in a block is not constant, compression speed may be the maximum compression speed or the worst compression speed at some times. Therefore, as to the first block, the calculation has to use the worst compression (expansion) speed $V_{min}$. Expansion time needed for the worst expansion time $V_{min}$ is $Bdot_1/V_{min}$. Then, if print start time (image output start enable time) by using the worst expansion time is denoted as "$tx_1$", $$(Bdot_1/V_{min}-tx_1)*V_p=Bdot_1.$$

Then, the print start time $tx_1$ is obtained as follows:

$$tx_1=Bdot_1(1/V_{min}-1/V_p). \qquad (9)$$

If print is activated at $tx_1$, print does not get ahead of expansion when expansion of the first block is completed.

Next, calculation on the second block is explained, wherein "$tx_2$" denotes image output start time which does not make print get ahead of expansion when expansion of the first and second blocks (dot numbers of $Bdot_1+Bdot_2$) is completed. Though the compression time of the second block is measured, it is needed to use the worst compression (expansion) speed as for the first block. However, for the first block, measured value $tc_1$ of compression time is available. Then, $$((tc_1+Bdot_2/V_{min})-tx_2)*V_p=Bdot_1+Bdot_2.$$

If print start time $tx_2$ is obtained with use of the above relation, the print start time $tx_2$ is obtained by using the worst expansion time for the second block as follows:

$$tx_2=tc_1+(Bdot_2/V_{min}-(Bdot_1+Bdot_2)/V_p) \quad (10)$$

Next, calculation on the N-th block is explained, wherein $tx_N$ denotes image output start time which does not make print get ahead of expansion when expansion to the N-th block is completed. Though the compression time of the N-th block is measured, it is needed to use the worst compression (expansion) speed as for the previous blocks. However, for the first to (N-1)-th blocks, the measured values $tc_m$ (m=1, 2, . . . , N-1) of compression time are available. Then, $$((\text{a sum of } tc_m \, (m=1,2,\ldots,N-1) + Bdot_N/V_{min}) - tx_N)*V_p =$$
$$\text{a sum of } Bdot_m \, (m=1,2,\ldots,N-1).$$

If print start time "$tx_N$" is obtained with use of the above relation, $tx_N$ is obtained by using the worst expansion time for the N-th block as follows:

$$tx_N=tc_m \, (m=1,2,\ldots,N-1)+(Bdot_N/V_{min}-\text{a sum of } Bdot_m \, (m=1, 2, \ldots, N-1)/V_p) \quad (11)$$

Figure 12:
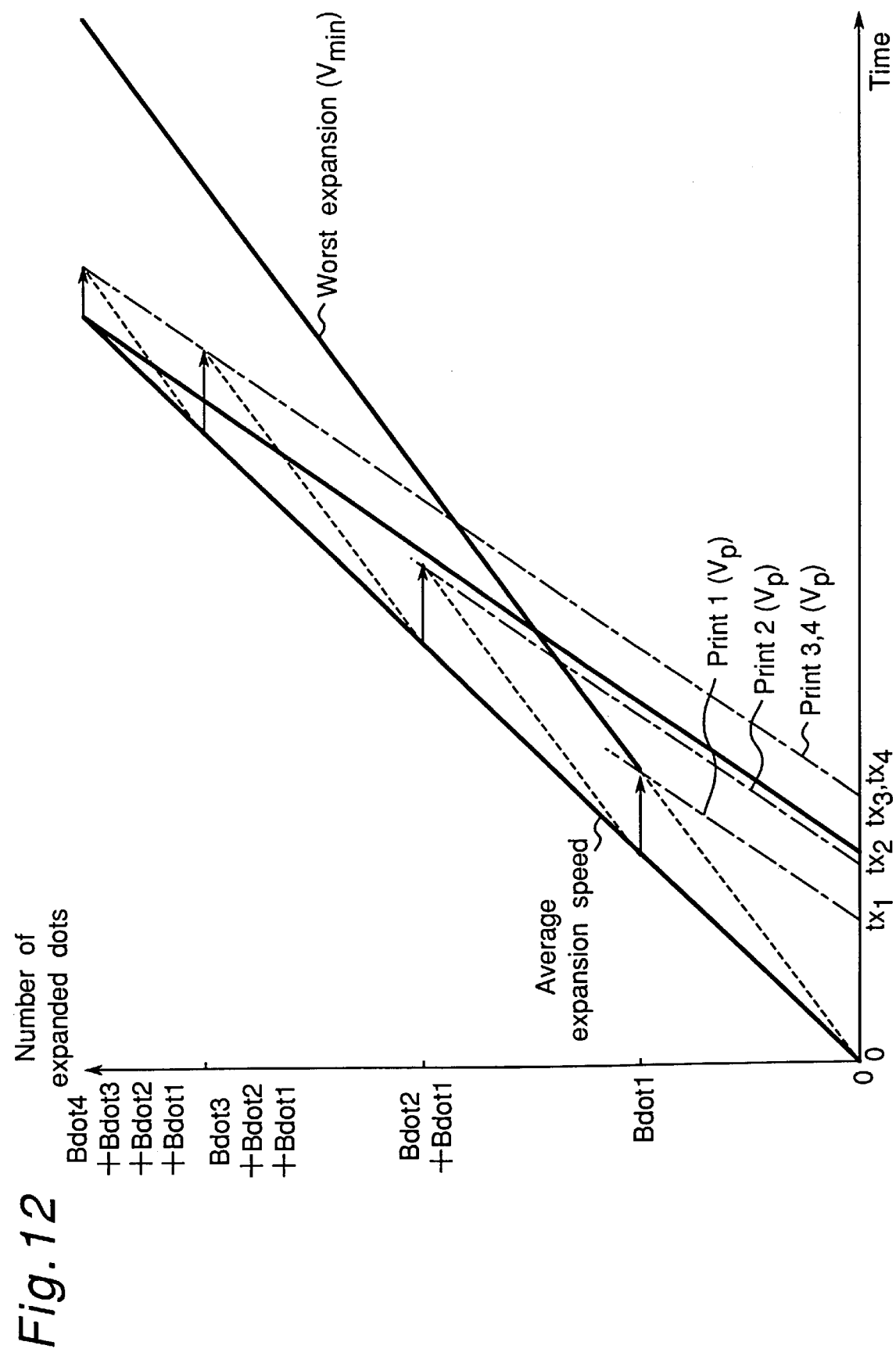
FIG. 12 is a diagram on a relation between expansion and printing.

In FIG. 12, $tx_3$ agrees with $tx_4$, but this is accidental. In general, the two are different from each other.

As explained above, when image output start timing tc is obtained with measured compression times $tc_m$ for each block, for the first block, image output start timing $tx_1$ is calculated with use of the worst compression speed by considering that compression speed may become lower than the average one within the block. On the other hand, for the second blocks and thereafter, image output start timing $tx_m$ (m =1, 2, 3, . . . , N) are calculated in the condition that print does not get ahead of expansion with use of measured compression times of the previous blocks even if expansion is performed at the worst expansion speed. Then, the image output start timing is set at the slowest among the calculated expansion start times for the blocks. The print throughput can be improved by starting print earlier by estimating the expansion time beforehand.

Figure 13:
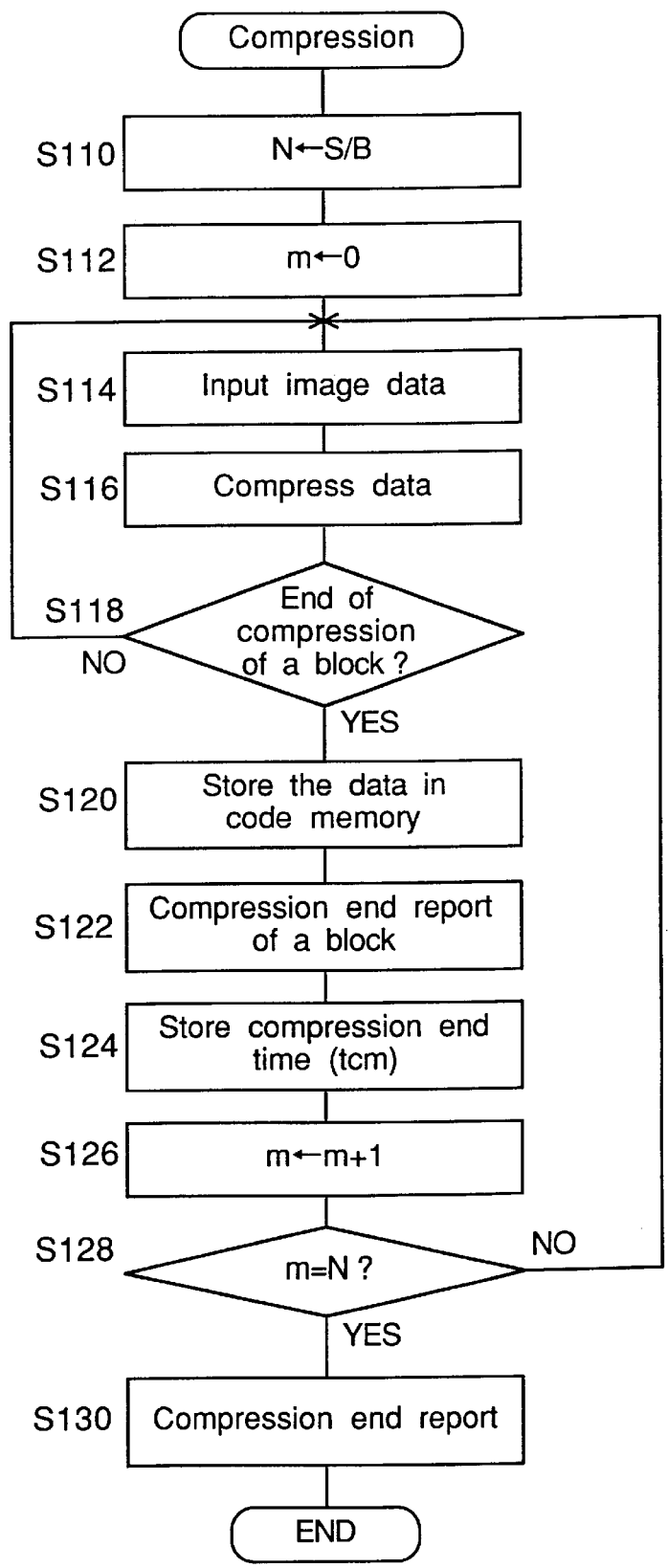
FIG. 13 is a flowchart of compression.
Figure 14:
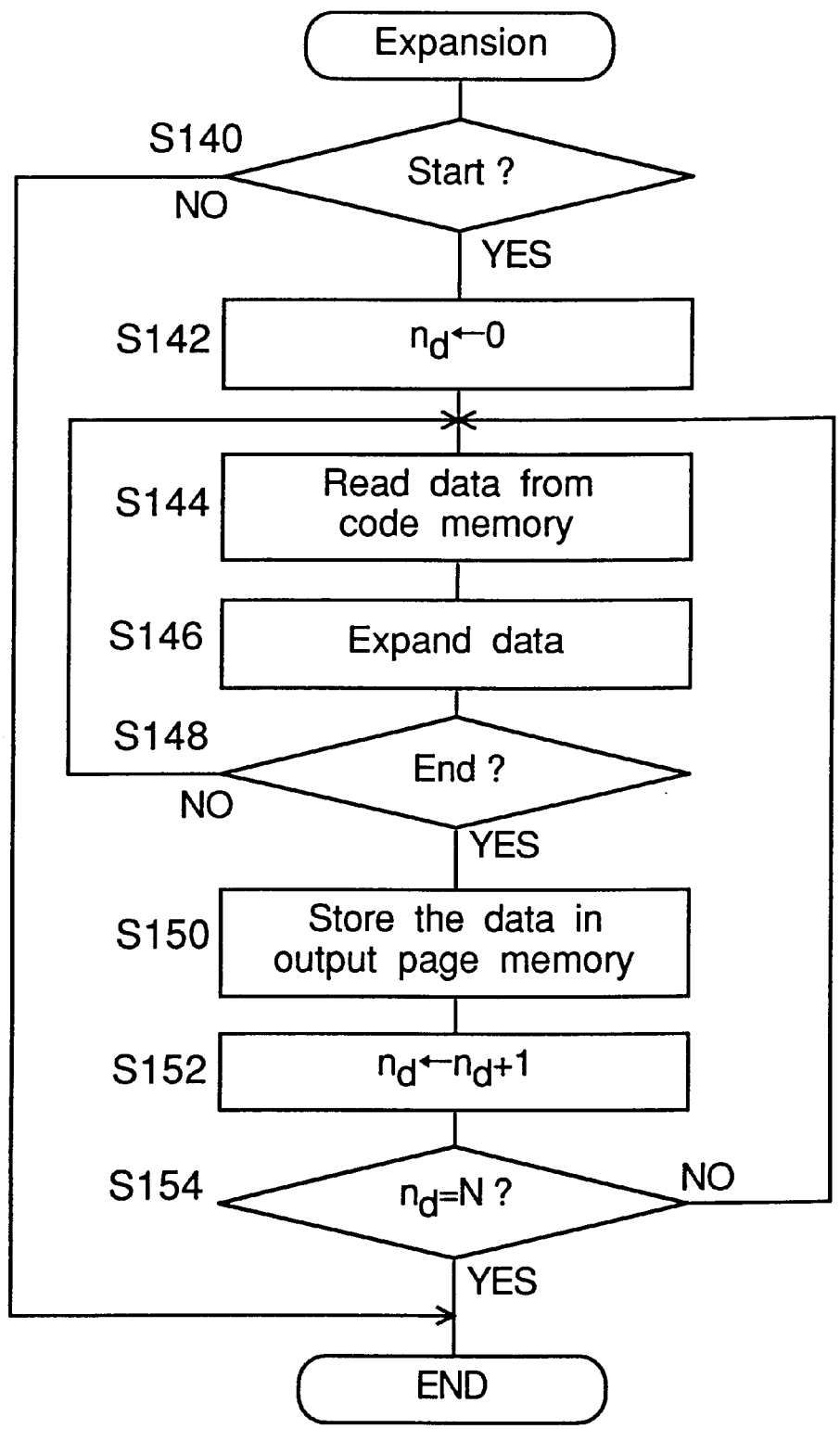
FIG. 14 is a flowchart of expansion.
Figure 15:
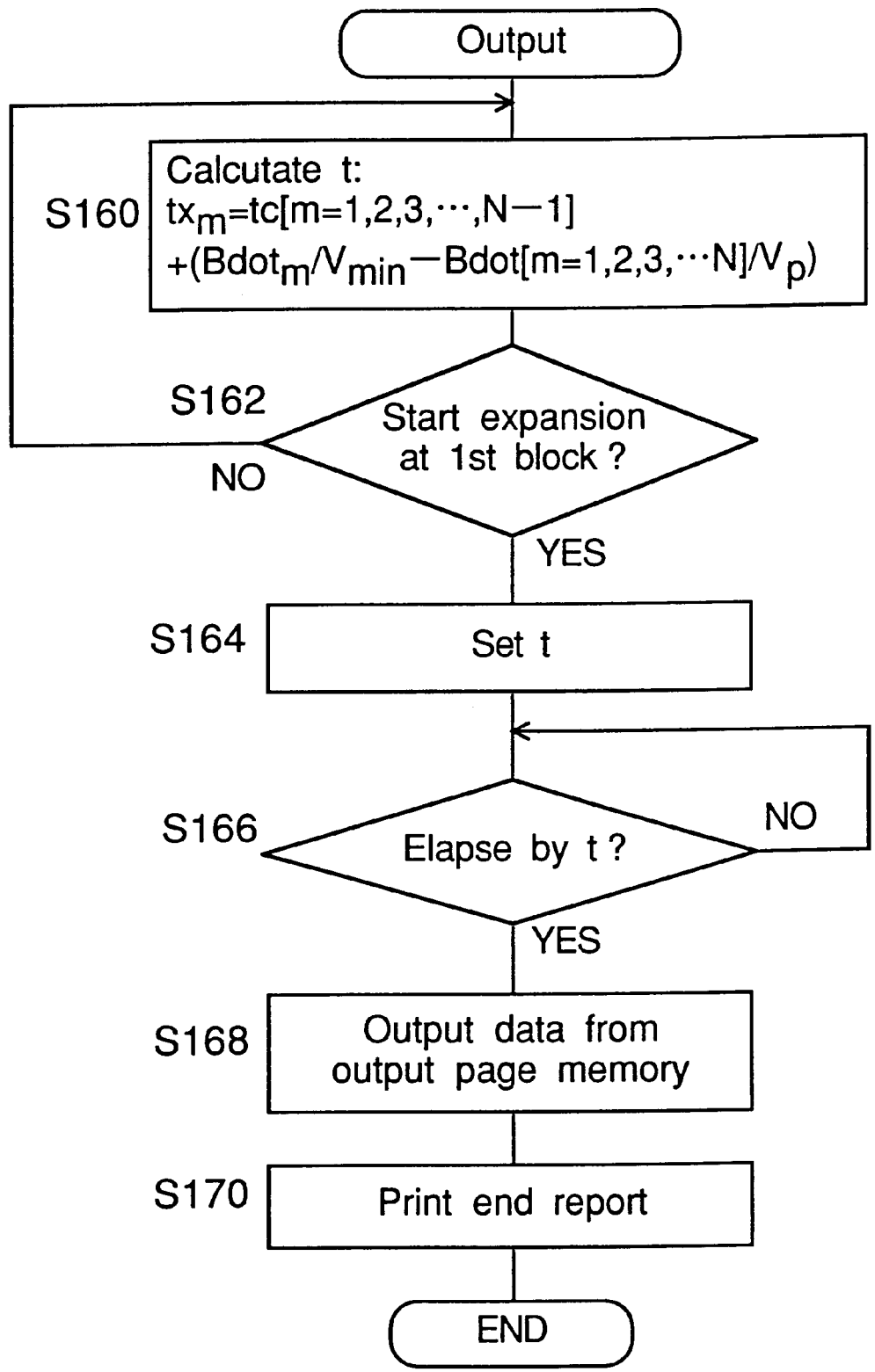
FIG. 15 is a flowchart of output processing.

FIGS. 13–15 shows flowcharts of compression, expansion and output executed by the CPU 106 controlling the memory unit 30. In the flow of compression shown in FIG. 13, first, the number N of blocks is calculated (step S110). That is, the number of the blocks is determined according to a document size S and a size B to be processed for each block. Next, a variable m is initialized at zero (step S112).

Then, image data are received (step S114), and they are compressed (step S116). The compression is repeated until compression of one block is decided to be completed (YES at step S118). Then, the compressed data are stored in the code memory 303 (step S120). If compression is performed on the first block, a first block compression end report is sent (step S122). Then, measured time $tc_m$ needed for compression of the block is stored in the block management information T2 in the management table (step S124). Next, m is incremented by one (step S126), the flow returns to step S114. If the incremented m is decided to become N (YES at step 114), or if expansion of all the blocks is completed, a compression end report is sent (step S130), and compression processing is completed.

In the flow of expansion shown in FIG. 14, first, expansion start timing is checked (step S140). Because expansion is possible if compression of one block is completed. Then, it is decided to be expansion start timing if compression of one block is completed. Next, a counter $n_d$ which represents expanded blocks is reset to zero (step S142).

Next, data are read from the code memory 303 (step S144), and they are expanded (step S146). The expansion is repeated until expansion of one block is decided to be completed (YES at step S148). Then, the expanded data are stored in the output page memory 306 (step S150). Then, the counter $n_d$ is incremented by one (step S152), and the flow returns to step S144. If the incremented $n_d$ is decided to become N (YES at step 154), or if expansion of all the blocks is completed, expansion processing is completed.

In the flow of compression shown in FIG. 15, until expansion of the first block is started (NO at step S162), timings $tx_m$ from start of expansion to data read from the output page memory 306 are calculated based on the compression times and dot number of each block, the worst compression time and read time (refer to Eqs. (9), (10) and (11)) (step S60). Then, the slowest time among the expansion start times of the blocks is set as the image output start timing t (step S166). Then, when expansion of the first block is started (YES at step S62), the time t is set (step S164), and a timer starts counting. If it is decided that the time t elapses (YES at step S166), image output enable report is sent to the CPU 105 (step S168), and when image output start request is received from the CPU 105, data read is started from the output page memory 306. Then, when data output is completed, a print end report is sent to the CPU 105 (step S170).

As explained above, because the time t needed for expansion for each block is estimated and read from the output page memory 306 is started, read does not get ahead of expansion. Further, because read is started without completion of expansion of one page, print is started earlier, and copy throughput is improved.

Next, a digital copying machine of a third embodiment of the invention is explained. The digital copying machine has the same structure as the first embodiment explained with reference to FIGS. 1–6. However, in this embodiment, when code data in the code memory 303 is expanded in the output page memory 306, image data are edited to synthesize additional information such as page number with image data. Then, a time from the start of expansion to the start of image output is shortened even when image data are edited. Though this embodiment is explained on a digital copying machine, it may also be applied to a page printer connected to a facsimile machine or the like.

If additional information is added with the image after expansion, copy speed is decreased largely by the addition. Even if image output is started so as not to get ahead of expansion, image output is started after completion of the synthesis with the additional information, and this delays image output start time and decreases image forming speed.

In this embodiment, additional information is drawn in the output page memory 306 before the image is expanded, and expanded image data are superposed in the output page memory which already has the additional information. Therefore, when additional information is synthesized with the image, image output can be started at a timing so that image output does not to get ahead of expansion, and the decrease in copy speed can be reduced to the minimum.

This processing is explained below in detail. Let us assume that a page number is added as a form data to the image. In a mode of page printing, when compressed image data are expanded in the output image memory 263, a page number in correspondence to the information in the code management table is drawn in the output page memory 306. (Table 1 shows an example of the code management table including page number) Next, image data expanded by the expansion device 264 are superposed in the output page memory 306 while they are transmitted to the print processor 40. At this time, transmission is performed so that image output does not get ahead of expansion. The form data is stored in the ROM 116, and the CPU 106 reads therefrom and writes to the output page memory 306. Thus, even when additional information such as page number is synthesized with an image, image output can be started at a timing so that image output does not to get ahead of expansion, and copy speed for a synthesized image can be improved.

TABLE 1

Code management table

| Image No. | size (V) | size (H) | Pointer | Compressed size | Compression time | Document data |
|---|---|---|---|---|---|---|
| 1 | 4500 | 3300 | 1 | 1050 | 235 | 2nd |
| 2 | 4500 | 3300 | 2 | 1000 | 220 | 1st |
| 3 | 4500 | 3300 | 3 | 1300 | 270 | 3rd |
| 4 | 4500 | 3300 | 4 | 850 | 180 | 4th |
| 5 | 4500 | 3300 | 5 | 1000 | 220 | 5th |

Next, processing by the CPU 106 of the memory unit 30 is explained. When the power supply is turned on, internal statuses and the like are initialized (step S201), and it is waited that copy start is instructed (step S202). Then, document read (step S203), compression (step S204), expansion (step S205) and print (step S206) are performed successively. Next, if copy is decided not to be completed (NO at step S206), the flow returns to step S203 to print a next document. On the other hand, if copy is decided to be completed (YES at step S206), the flow returns to step S202 to wait copy start instruction.

Figure 16:
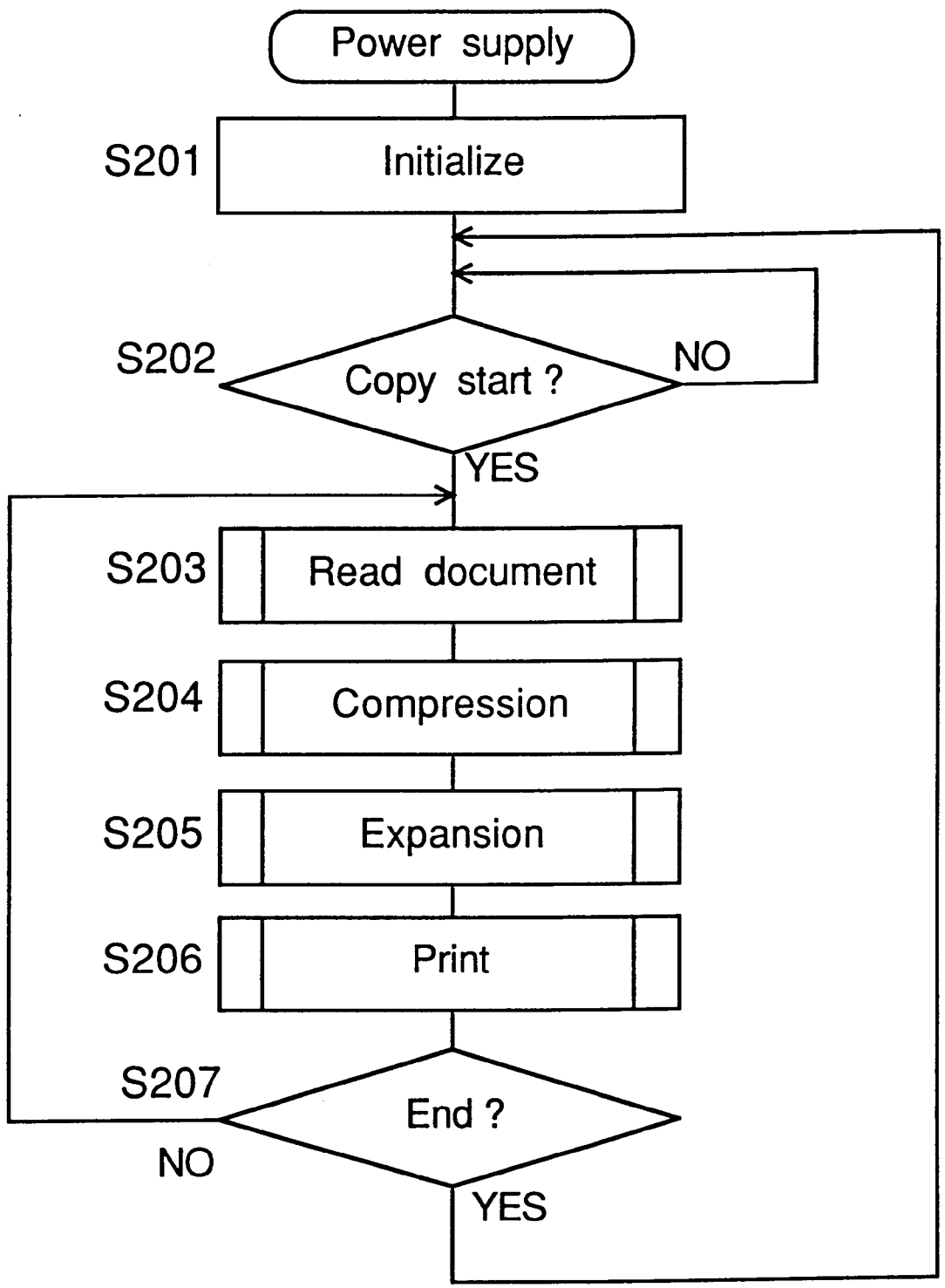
FIG. 16 is a flowchart of a main routing of CPU 106 in a third embodiment.
Figure 17:
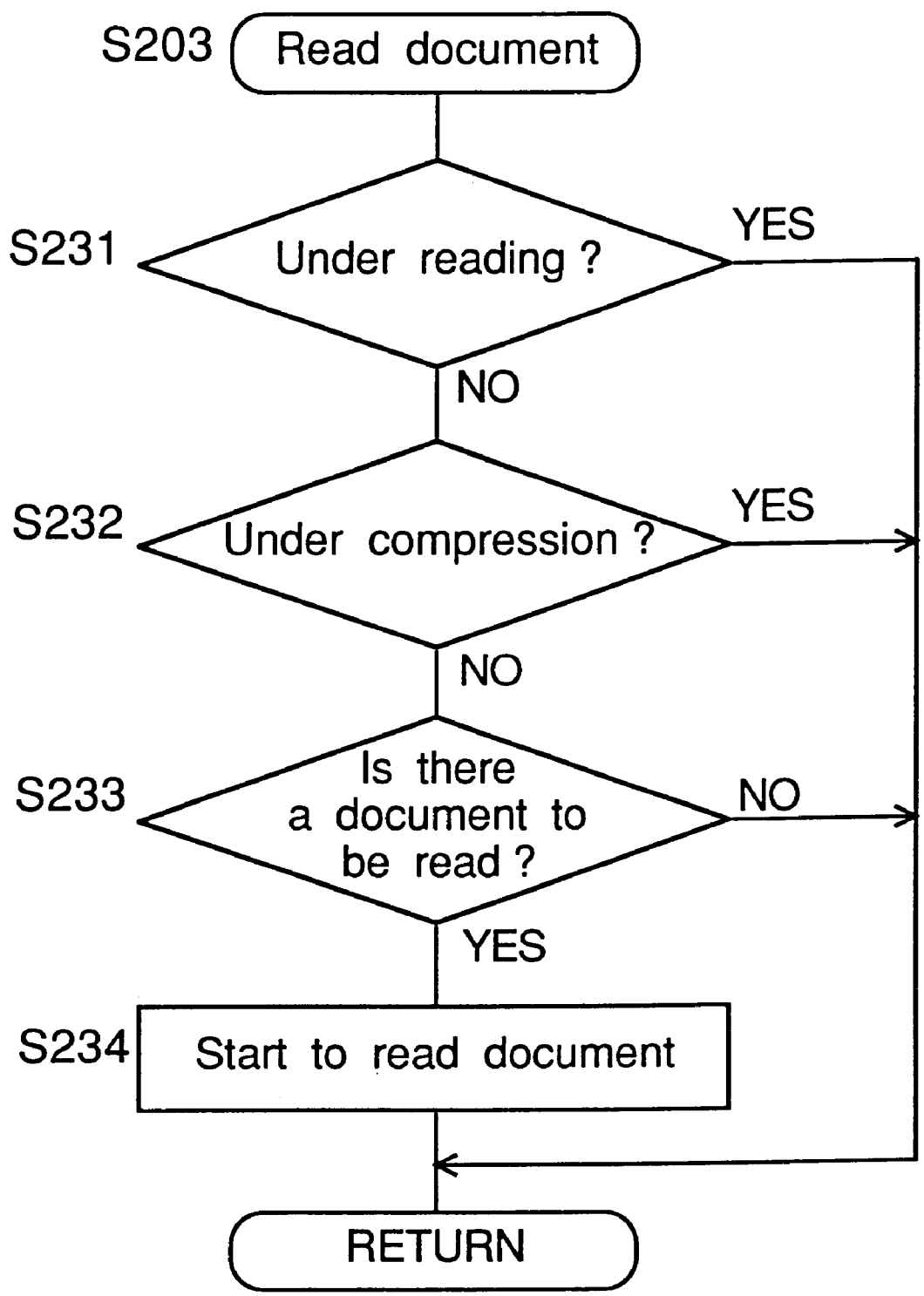
FIG. 17 is a flowchart of read document.

FIG. 17 is a flowchart of compression (step S203 in FIG. 16). If it is decided that a document is under reading or image data are being transmitted from the image reader 200 to the input page memory 301 (YES at step S231), the flow returns readily to the main flow. If it is decided that a document is not under reading (NO at step S231), image read is started (step S234) when the data is not being compressed (NO at step S232) and when there is a document to be read (YES at step S233).

Figure 18:
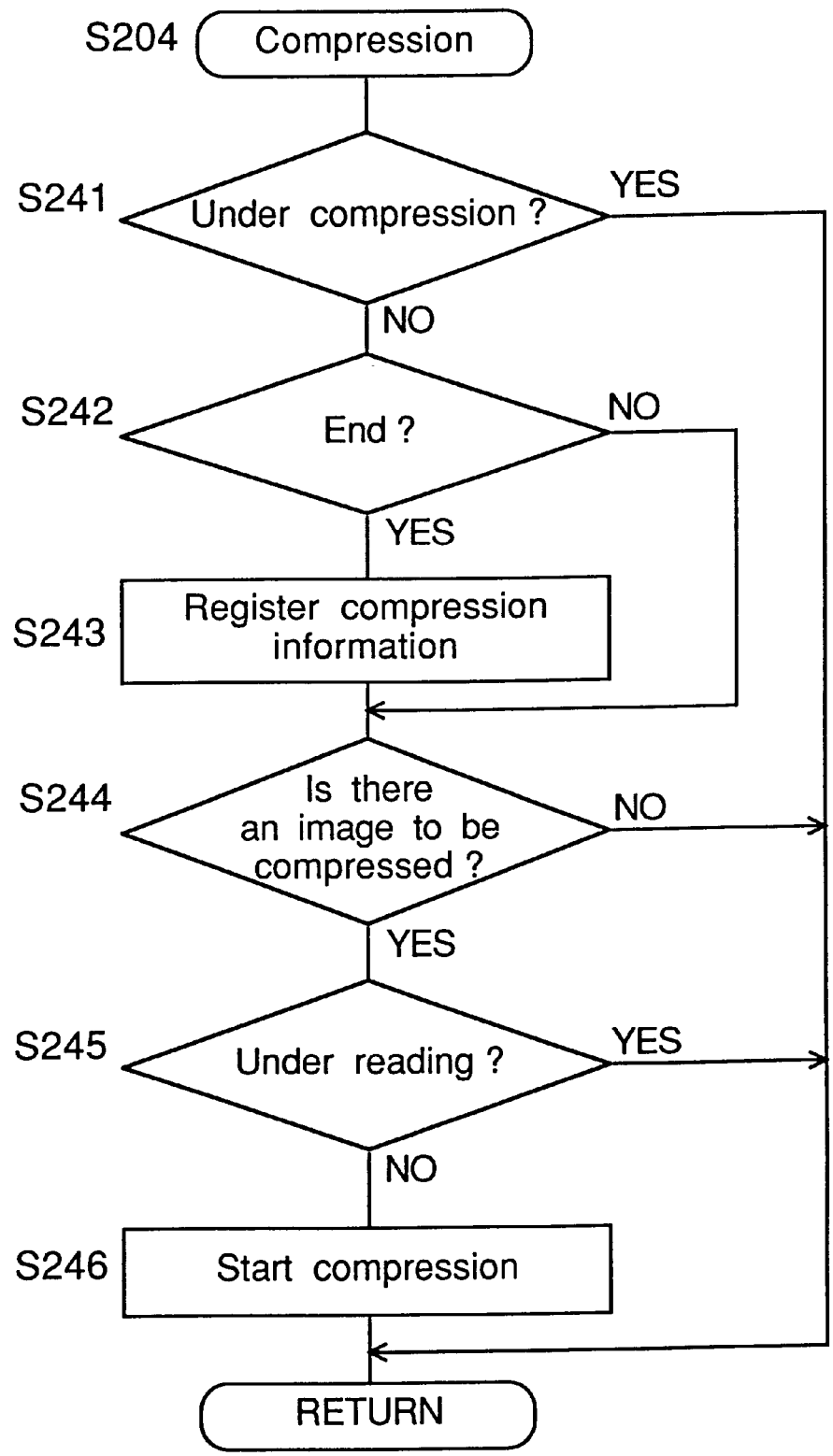
FIG. 18 is a flowchart of compression.

FIG. 18 is a flowchart of expansion (step S204 in FIG. 16). First, it is decided if data are not being compressed (step S241). If compression is performed (YES at step S241), the flow returns readily to the main flow. If compression is not performed (NO at step S241), when it is decided that compression is completed just now (YES at step S242), compression information is stored in the code management table (step S243). Next, if it is decided that there is an image to be compressed (YES at step S244), compression is started (step S246) when image data are not being read (NO at step S245).

Figure 19:
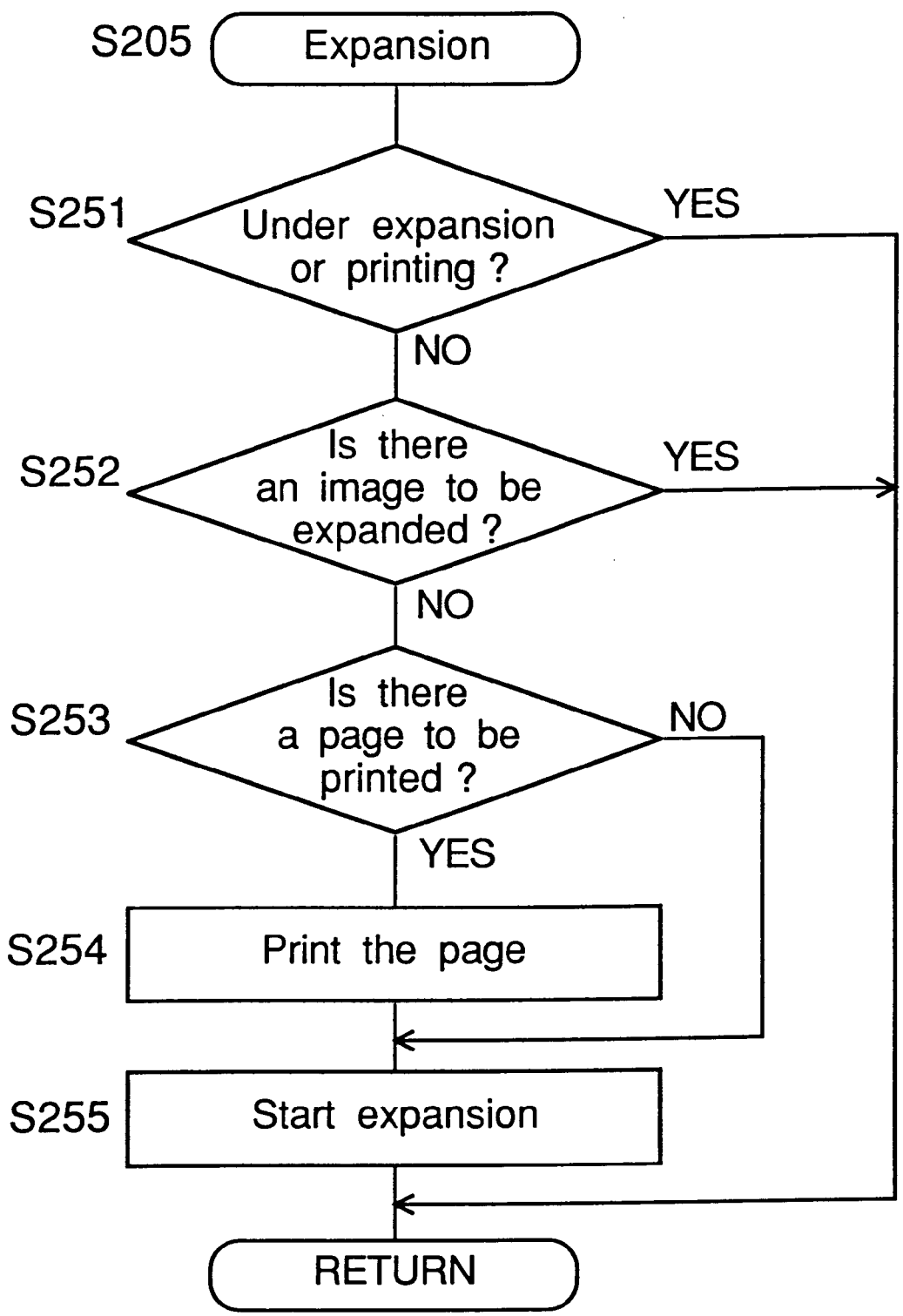
FIG. 19 is a flowchart of expansion.

FIG. 19 is a flowchart of print (step S205 in FIG. 16). First, it is decided if data are not being expanded or printed (step S251). If expansion or print is performed (YES at step S251), the flow returns readily to the main flow. If expansion or print is not performed (NO at step S251), it is decided next if there is an image to be expanded from the code management table (step S252). If there is an image to be expanded (YES at step S252), expansion is started (step S255). If there is an image to be expanded (YES at step S252) and page print mode is set (YES at step S253), the page number obtained with reference to the code management table is drawn in the output page memory 306 (step S254). Then, expansion is started (step S255).

Figure 20:
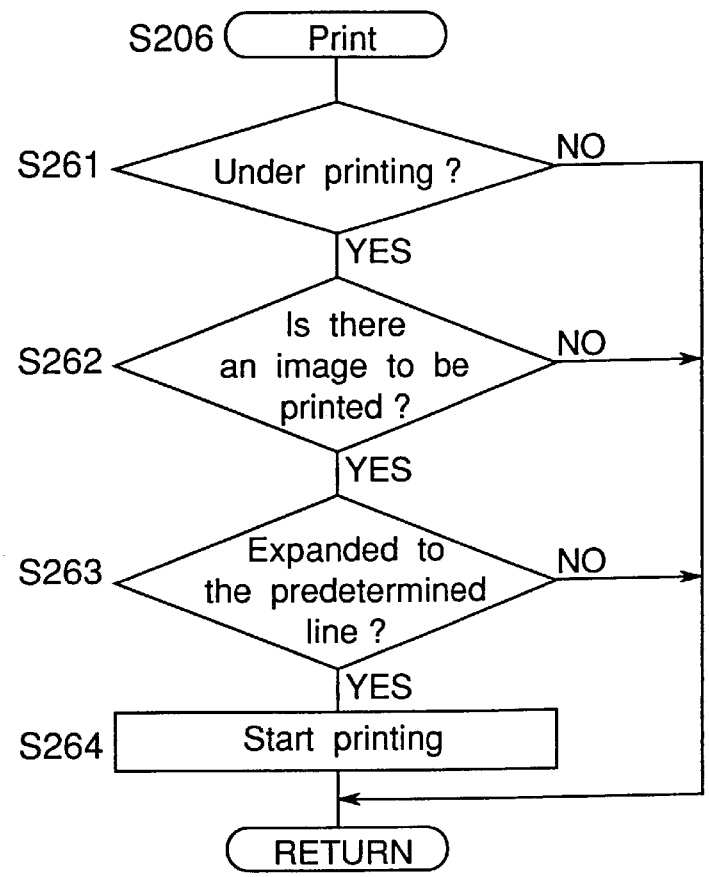
FIG. 20 is a flowchart of print.
Figure 21:
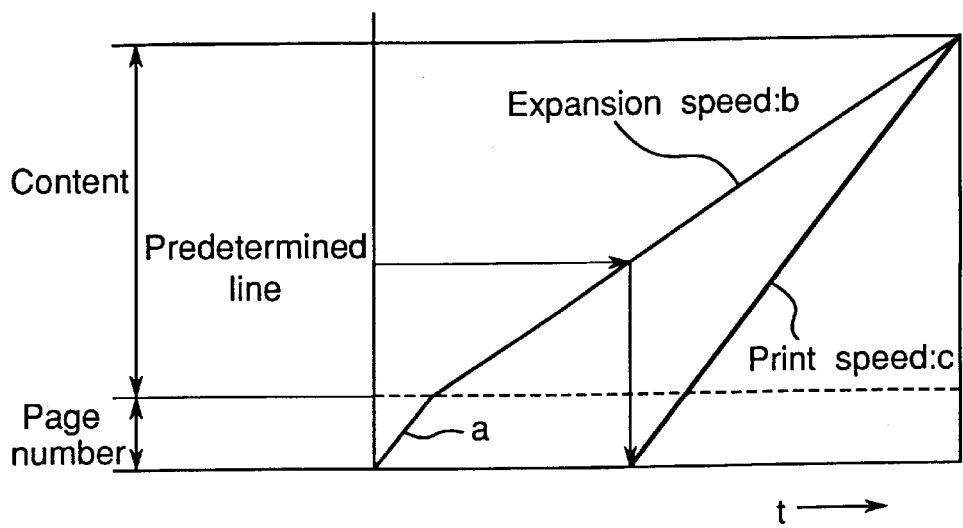
FIG. 21 is a timing chart of expansion and image output.

FIG. 20 is a timing chart of expansion and image output (step S206 in FIG. 16). First, it is decided if print is not being performed (step S261). If print is being performed (YES at step S261), the flow returns readily to the main flow. If print is not being performed (NO at step S261), it is confirmed next that there is an image to be printed (step S262). If there is an image to be printed (YES at step S262), print is started (step S264) after confirming that data are expanded to a predetermined line which enables to start print (YES at step S263).

FIG. 20 is a timing chart of expansion and image output wherein horizontal axis represents a time and vertical axis represents the amount of data in the output page memory 306. In the page print mode, a page number is first drawn in the output page memory 306 is at a predetermined position at a speed of "a". Next, image data expanded are superposed in the output page memory 306 at an expansion speed of "b". Print is started at a timing so that image output does not to get ahead of expansion. In concrete, when image data are drawn to the predetermined line determined by taking a difference between the print speed "a" and the expansion speed "b" into account, image data are started to be transmitted to the print processor 40 at print speed "c".

In this example, print speed is higher than expansion speed. However, if print speed is not higher than expansion speed, transmission of image data in the output page memory 306 can be started at the same time as expansion.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus for reading a document image and forming the document image on a paper, the image forming apparatus comprising:

a first memory device for storing data;

a compression device for dividing document image data into a plurality of blocks and compressing the document image data in the unit of blocks to be stored in said first memory device;

a second memory device for storing data;

an expansion device for expanding the compressed data read from said first memory device in the unit of blocks and storing the expanded data in said second memory device;

a printer which prints data read from said second memory device; and a controller estimating compression time for compression by said compression device and expansion time for expansion by said expansion device and setting image output start time for said printer based on the estimated compression and expansion times before expansion of all the blocks by said expansion device is completed.

2. The image forming apparatus according to claim 1, wherein said controller estimates the compression and expansion times during compression by said compression means.

3. The image forming apparatus according to claim 1, wherein said controller estimates the expansion time based on the worst expansion speed of said expansion device.

4. The image forming apparatus according to claim 1, wherein said controller estimates the expansion time based on the compression rate of said expansion device.

5. The image forming apparatus according to claim 2, wherein said compression device measures compression and time of a first block, and said controller estimates the compression and expansion times based on a time for inputting the document image data and the measured compression end time.

6. The image forming apparatus according to claim 1, wherein said controller estimates the compression and expansion times based on times for compression and for expansion estimated for each block and image output time.

7. The image forming apparatus according to claim 1, further comprising:
an image rotation device for rotating an image stored in said second memory device;
a paper supplier for supplying a paper to said printer;
a second controller which inhibits said image rotation device to rotate the image and makes said paper supplier supply a paper in the same direction as that of the image automatically if said paper supplier can supply a first paper of the same size in the same direction as the image and a second paper of the same size but in a lateral direction to that of the first paper, when said printer starts printing during compression by said compression device.

8. A method for reading a document image and forming the document image on a paper comprising the steps of:
reading a document image to generate document image data;
dividing the document image data into a plurality of blocks, and compressing the document image data in the unit of blocks to be stored in a first memory device;
expanding the compressed data read from the first memory device in the unit of blocks, and storing the expanded data in a second memory device;
estimating compression time of data not yet compressed, and setting image output start time from the second memory device for a printer based on the estimated compression time; and
starting to print an image by a printer at the image output start time by reading image output data from said second memory device.

9. The method according to claim 8, wherein the expansion time is estimated in the unit of blocks based on times for compression for the blocks.

10. The method according to claim 9, wherein the image output start time is set by using estimated expansion time of data not yet expanded and a time to output the image data to the printer.

11. An image forming apparatus for reading a document image and forming the document image on a paper comprising:
a first memory device for storing data;
a compression device for dividing document image data into a plurality of blocks and compressing the document image data in the unit of blocks to be stored in said first memory device;
a second memory device for storing data;
an expansion device for expanding the data read from said first memory device in the unit of blocks and storing the expanded data in said second memory device;
a printer for printing the data read from said second memory device to form an image; and
a controller for setting a start time to read data from said second memory device by said printer after estimating the start time based on an expansion time of data not yet expanded by said expansion device.

12. The image forming apparatus according to claim 11, wherein said controller estimates times for expansion on all the blocks in the unit of blocks and sets the start time based on times for expansion estimated on all the blocks and a time to output the image data.

13. The image forming apparatus according to claim 11, wherein said controller estimates the time for expansion for each block with a process which is not necessarily the same among the blocks.

14. The image forming apparatus according to claim 13, wherein said controller sets the start time to start read from the second memory device based on the slowest expansion time for a block wherein write to and read from the second memory device of expanded data are performed at the same time.

15. The image forming apparatus according to claim 11, wherein said controller estimates the expansion time based on the compression time.

16. The image forming apparatus according to claim 11, wherein said controller estimates the expansion time based on a document size.

17. An image forming apparatus for reading a document image and forming the document image on a paper, the image forming apparatus comprising:
an image reader for reading a document image to generate document image data;
a first memory device for storing data;
a compression decide for dividing the document image information into a plurality of blocks and compressing the document image data in the unit of blocks to be stored in said first memory device;
a second memory device for storing data;
an expansion device for expanding the data read from said first memory device in the unit of blocks and storing the expanded data in said second memory device;
a printer for reading image output data from said second memory to print an image; and
a controller for estimating compression time on data not yet compressed by said compression device and expansion time by said expansion device and setting an image output start time by said printer based on the estimated compression and expansion times before expansion of all the blocks by said expansion device is completed.

18. The image forming apparatus according to claim 17, wherein said controller is operated in a single copy mode.

19. An image forming apparatus for reading a document image and forming the document image on a paper, the image forming apparatus comprising:
a first memory device for storing data;
a compression device for compressing the image data to be stored in said first memory device;
a second memory device for storing predetermined form data;
a page memory device for drawing expanded image data stored in said first memory device and the form data stored in said second memory device;

an expansion device for expanding the data from said first memory device and storing the expanded data in said page memory device;

a printer for reading data from said page memory device to print an image on a paper;

a synthesizing unit for drawing the form data in said page memory device first and superposing the expanded data of the data read from said first memory device in said page memory device wherein the form data have already been drawn; and a controller for starting image output by said printer at a timing before expansion of image data by said expansion device is not completed so that data output does not get ahead of expansion.

20. The image forming apparatus according to claim 19, wherein said expansion device expands data successively from portions of the data in said page memory device in an order that an image is formed by said printer.

21. The image forming apparatus according to claim 19, further comprising an image reader for reading a document image to generate image information.

22. The image forming apparatus according to claim 19, wherein said first memory device can store a plurality of images.

23. The image forming apparatus according to claim 19, wherein the form data is a page data.

24. An image forming apparatus for reading a document image and forming the document image on a paper, the image forming apparatus comprising:

an input port for receiving image data;

a compression device for compressing the image data received by said input port;

a first memory device for storing image data compressed by said compression device;

a second memory device for storing predetermined form data;

a page memory device for drawing the form data stored in said second memory device and expanded image data stored in said first memory device;

an expansion device for expanding the data read from said first memory device and drawing the expanded data in said page memory device;

a synthesizing unit for drawing the form data in said page memory device first and superposing the expanded data of the data read from said first memory device in said page memory device wherein the form data have already been drawn; and a controller for starting image output at a timing before expansion of image data by said expansion device is not completed so that data output does not get ahead of expansion.

25. The image forming apparatus according to claim 24, further comprising a compression device for compressing the image data received by said input port, wherein image data compressed by said compression device are stored in said first memory device.

26. A method for reading a document image and forming the document image on a paper, comprising the steps of:

compressing image data to be stored in a first memory;

storing predetermined form data in a second memory;

expanding the data read from the first memory device and storing the expanded data in a page memory device;

drawing the form data read from the second memory device in a page memory device;

superposing expanded image data read from the first memory device in the page memory device wherein the form data have already been drawn;

starting to print data read from the page memory device at a timing before expansion of image data is not completed so that data output does not get ahead of expansion in the page memory device.

27. The method according to claim 26, further comprising the step of reading a document image to generate image information to be stored in the first memory.

28. A method for reading a document image and forming the document image on a paper, the method comprising the steps of:

receiving image data to be stored in a first memory device;

storing predetermined form data in a second memory;

drawing the form data in a page memory device;

expanding data read from the first memory device and superposing the expanded data in the page memory device wherein the form data have already been drawn; and wherein image data output for printing is started at a timing before expansion of image data is not completed so that image data output does not get ahead of expansion in the page memory device.

29. The method according to claim 28, further comprising the step of compressing the image data received, wherein image data compressed are stored in the first memory device.

* * * * *

UNITED STATES PATENT AND TRADEMARK OFFICE
CERTIFICATE OF CORRECTION

PATENT NO. : 6,043,897
DATED : March 28, 2000
INVENTOR(S) : Takeshi MORIKAWA, et al.

It is certified that error appears in the above-identified patent and that said Letter Patent is hereby corrected as shown below:

On the Title page:

Section [30], under Foreign Application Priority Data, change the filing date for Japanese Patent Application No. 9-054966 from "December 5, 1996" to --March 10, 1997--.

Signed and Sealed this

Fifteenth Day of May, 2001

*Attest:*

NICHOLAS P. GODICI

*Attesting Officer*     *Acting Director of the United States Patent and Trademark Office*